United States Patent [19]
Nakatani et al.

[11] Patent Number: 5,808,598
[45] Date of Patent: Sep. 15, 1998

[54] DISPLAY METHOD OF NAVIGATION MAP

[75] Inventors: Akihiro Nakatani, Itami; Hiroki Takita, Tokyo, both of Japan

[73] Assignees: Mitsubishi Electric Semiconductor Software Corporation, Itami; Mitsubishi Denki Kabushiki Kaisha, Tokyo, both of Japan

[21] Appl. No.: 597,473

[22] Filed: Feb. 2, 1996

[30] Foreign Application Priority Data

Feb. 7, 1995 [JP] Japan ................................. 7-019233

[51] Int. Cl.$^6$ ............................................. G09G 5/34
[52] U.S. Cl. ...................... 345/123; 701/200; 340/990
[58] Field of Search ............................... 345/123, 124, 345/125, 121, 133; 395/341; 364/449.1, 449.2; 340/990, 995; 701/200

[56] References Cited

U.S. PATENT DOCUMENTS

| | | | |
|---|---|---|---|
| 4,571,684 | 2/1986 | Takanabe | 340/990 |
| 5,371,846 | 12/1994 | Bates | 345/123 |
| 5,396,430 | 3/1995 | Arakawa et al. | 340/890 |
| 5,398,188 | 3/1995 | Maruyama | |
| 5,434,591 | 7/1995 | Goto | 345/123 |

*Primary Examiner*—Steven J. Saras
*Assistant Examiner*—Xu-Ming Wu
*Attorney, Agent, or Firm*—Oblon, Spivak, McClelland, Maier & Neustadt, P.C.

[57] ABSTRACT

To obtain a display method navigation map intended to lessen the load of control means such as CPU, by quick scroll display. By comparison between preceding judging region (JO) and present judging region (JN), a changing direction of judging region is recognized, and rewriting is processed in advance in a page (display off divided memory region) of a map memory, being out of map display region of a display device. At this time, rewriting is processed by priority in a divided memory region that is high in possibility of move of the own vehicle and that must be written at the earliest opportunity.

15 Claims, 19 Drawing Sheets

FIG. 2

| 1 | 2 | 3 |
|---|---|---|
| 4 | 5 | 6 |
| 7 | 8 | 9 |

FIG. 3

| 5 | 6 | 4 | 5 | 6 | 4 | 5 |
|---|---|---|---|---|---|---|
| 8 | 9 | 7 | 8 | 9 | 7 | 8 |
| 2 | 3 | 1 | 2 | 3 | 1 | 2 |
| 5 | 6 | 4 | 5 | 6 | 4 | 5 |
| 8 | 9 | 7 | 8 | 9 | 7 | 8 |
| 2 | 3 | 1 | 2 | 3 | 1 | 2 |
| 5 | 6 | 4 | 5 | 6 | 4 | 5 |

| 1 PAGE | 2 PAGE | 3 PAGE |
|---|---|---|
| 4 PAGE | 5 PAGE | 6 PAGE |
| 7 PAGE | 8 PAGE | 9 PAGE |

| 9 | 7 | 8 | 9 |
|---|---|---|---|
| 3 | 1 | 2 | 3 |
| 6 | 4 | 5 | 6 |
| 9 | 7 | 8 | 9 |

······ MAP DRAWING REGION BEFORE CHANGE

—— MAP DRAWING REGION AFTER CHANGE

FIG. 13

| PAGE DIRECTION 1 | PAGE DIRECTION 2 | PAGE DIRECTION 3 |
|---|---|---|
| PAGE DIRECTION 4 | REFERENCE PAGE | PAGE DIRECTION 5 |
| PAGE DIRECTION 6 | PAGE DIRECTION 7 | PAGE DIRECTION 8 |

FIG. 14

| PAGE DIRECTION 1 ,PAGE 5 | PAGE DIRECTION 2 ,PAGE 6 | PAGE DIRECTION 3 ,PAGE 7 |
|---|---|---|
| PAGE DIRECTION 4 ,PAGE 8 | REFERENCE PAGE PAGE 9 | PAGE DIRECTION 5 ,PAGE 7 |
| PAGE DIRECTION 6 ,PAGE 2 | PAGE DIRECTION 7 ,PAGE 3 | PAGE DIRECTION 8 ,PAGE 1 |

FIG. 15

| 1 | 2 |
|---|---|
| 3 | 4 |

FIG. 16

| PAGE 1-1 | PAGE 1-2 | PAGE 2-1 | PAGE 2-2 |
|---|---|---|---|
| PAGE 1-3 | PAGE 1-4 | PAGE 2-3 | PAGE 2-4 |
| PAGE 3-1 | PAGE 3-2 | PAGE 4-1 | PAGE 4-2 |
| PAGE 3-3 | PAGE 3-4 | PAGE 4-3 | PAGE 4-4 |

FIG. 17

| 1 | 2 | 1 | 2 | 1 | 2 |
|---|---|---|---|---|---|
| 3 | 4 | 3 | 4 | 3 | 4 |
| 1 | 2 | 1 | 2 | 1 | 2 |
| 3 | 4 | 3 | 4 | 3 | 4 |
| 1 | 2 | 1 | 2 | 1 | 2 |
| 3 | 4 | 3 | 4 | 3 | 4 |

| 16 | 13 | 14 | 15 | 16 |
|----|----|----|----|----|
| 4  | 1  | 2  | 3  | 4  |
| 8  | 5  | 6  | 7  | 8  |
| 12 | 9  | 10 | 11 | 12 |
| 16 | 13 | 14 | 15 | 16 |

| 1-1 | 1-2 | 2-1 | 2-1 | 1-1 | 1-2 |
|-----|-----|-----|-----|-----|-----|
| 1-3 | 1-4 | 2-3 | 2-4 | (1-3) | 1-4 |
| 3-1 | 3-2 | 4-1 | 4-2 | (3-1) | 3-2 |
| 3-3 | 3-4 | 4-3 | 4-4 | (3-3) | 3-4 |
| 1-1 | (1-2) | (2-1) | (2-2) | (1-1) | 1-2 |
| 1-3 | 1-4 | 2-3 | 2-4 | 1-3 | 1-4 |

····· MAP DRAWING REGION BEFORE CHANGE
——— MAP DRAWING REGION AFTER CHANGE

| PAGE 1 | PAGE 1 |
|--------|--------|
| PAGE 1 | PAGE 1 |

DATA COMPOSITION UNIT

FIG. 23

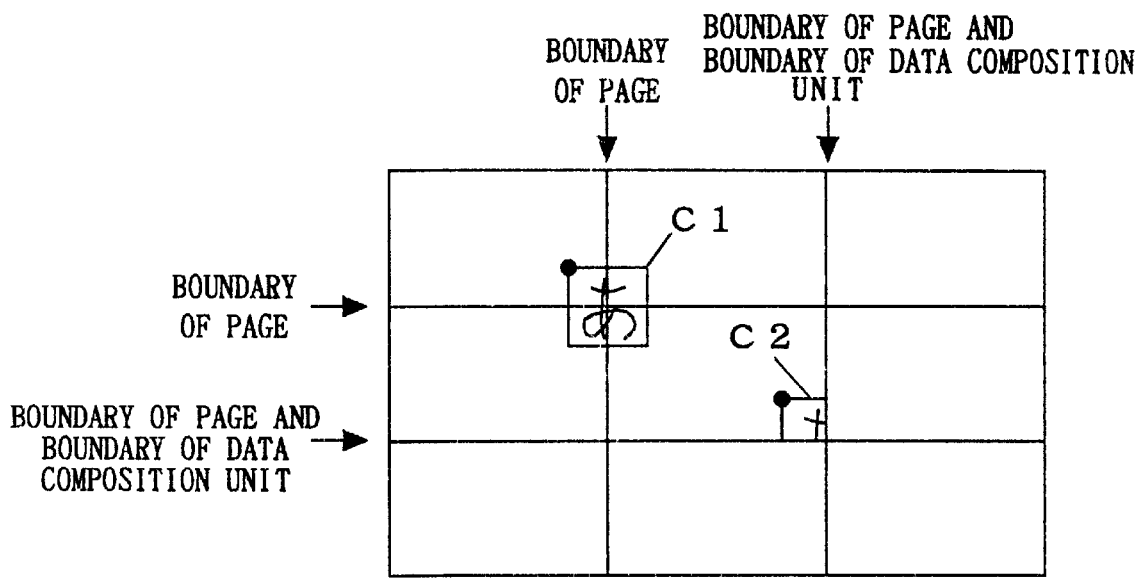

BOUNDARY OF PAGE
BOUNDARY OF PAGE AND BOUNDARY OF DATA COMPOSITION UNIT
BOUNDARY OF PAGE
BOUNDARY OF PAGE AND BOUNDARY OF DATA COMPOSITION UNIT

FIG. 24

| PAGE DIRECTION 1-1 | PAGE DIRECTION 1-2 | PAGE DIRECTION 2-1 | PAGE DIRECTION 2-2 | PAGE DIRECTION 3-1 | PAGE DIRECTION 3-2 |
|---|---|---|---|---|---|
| PAGE DIRECTION 1-3 | PAGE DIRECTION 1-4 | PAGE DIRECTION 2-3 | PAGE DIRECTION 2-4 | PAGE DIRECTION 3-3 | PAGE DIRECTION 3-4 |
| PAGE DIRECTION 4-1 | PAGE DIRECTION 4-2 | REFERENCE PAGE 1 | REFERENCE PAGE 2 | PAGE DIRECTION 5-1 | PAGE DIRECTION 5-2 |
| PAGE DIRECTION 4-3 | PAGE DIRECTION 4-4 | REFERENCE PAGE 3 | REFERENCE PAGE 4 | PAGE DIRECTION 5-3 | PAGE DIRECTION 5-4 |
| PAGE DIRECTION 6-1 | PAGE DIRECTION 6-2 | PAGE DIRECTION 7-1 | PAGE DIRECTION 7-2 | PAGE DIRECTION 8-1 | PAGE DIRECTION 8-2 |
| PAGE DIRECTION 6-3 | PAGE DIRECTION 6-4 | PAGE DIRECTION 7-3 | PAGE DIRECTION 7-4 | PAGE DIRECTION 8-3 | PAGE DIRECTION 8-4 |

FIG. 29

| × | × | × | × | × | × |
|---|---|---|---|---|---|
| × | 1 | 2 | 3 | 4 | × |
| × | 5 | 6 | 7 | 8 | × |
| × | 9 | 10 | 11 | 12 | × |
| × | 13 | 14 | 15 | 16 | × |
| × | × | × | × | × | × |

FIG. 30

| 1 | 2 | 3 |
|---|---|---|
| 5 | 6 | 7 |
| 9 | 10 | 11 |

FIG. 31

| 1 | 2 | 3 |
|---|---|---|
| 5 | 6 | 7 |
| 9 | 10 | 11 |

FIG. 32

| 5 | 6 | 7 |
|---|---|---|
| 9 | 10 | 11 |
| 9 | 10 | 11 |

FIG. 33

| 5 | 6 | 7 |
|---|---|---|
| 9 | 10 | 11 |
| 13 | 14 | 15 |

FIG. 34

| 1 | 2 | 3 |
|---|---|---|
| 5 | 6 | 7 |
| 9 | 10 | 11 |

FIG. 35

| 1 | 2 | 3 |
|---|---|---|
| 5 | 6 | 7 |
| 9 | 10 | 11 |

F I G. 3 6

| 6 | 7 | 3 |
|---|---|---|
| 10 | 11 | 7 |
| 9 | 1 0 | 1 1 |

F I G. 3 7

| 6 | 7 | 8 |
|---|---|---|
| 10 | 11 | 12 |
| 14 | 15 | 16 |

DISPLAY METHOD OF NAVIGATION MAP

BACKGROUND OF THE INVENTION

1. Field of the Invention

The present invention relates to a display method of navigation map having a function for updating the navigation map by scrolling the display screen appropriately depending on the present position of the own vehicle.

2. Description of the Background Art

A map scroll of a conventional navigation system comprises a map memory corresponding to, for example, nine screens (three screens by three screens) of screen display size, and 16 continuous maps in the display screen size in each frame shown in FIG. 29 are stored in an external device such as a CD-ROM.

There are maps shown in FIG. 30 on the map memory of nine screens, and on the basis of the information relating to the position of the own vehicle, when scrolled immediately beneath by judging that the own vehicle is moving immediately beneath in FIG. 30, the region of the map being displayed at the present is the region indicated by shaded regions in FIG. 31 (5, 6, 7, 9, 10, 11), and the shaded regions in FIG. 31 are copied into the shaded regions in FIG. 32, and the maps (13, 14, 15) continuous to the lower side of the shaded regions in FIG. 32 (9,10, 11) are drawn on the shaded regions in FIG. 33.

In another example, there are maps shown in FIG. 34 on the map memory of nine screens, and when scrolled down to the right judging that the own vehicle is moving down to the right in FIG. 34, the region of the map being displayed at the present is the region indicated by shaded regions in FIG. 35 (5, 6, 8, 9), and the shaded regions in FIG. 35 are copied into shaded regions in FIG. 36, and maps (8, 12, 14, 15, 16) continuous to the lower right side of the shaded regions in FIG. 36 (7, 10, 11) are drawn on the shaded regions in FIG. 37. By copying and drawing in this manner, scrolling is done infinitely.

The moving status of the own vehicle is judged by comparison between the nine scroll judging regions for judging where the map (region) of the present display out of nine screens is located in the map of the map memory, and the position coordinates of the reference point on the display screen.

The reference point on the display screen is set at an arbitrary position, such as upper right, lower right, upper left, lower left, or center position of the display screen, in the case of navigation system for displaying the position of the own vehicle in the center of the screen.

The conventional navigation map was scrolled in such a manner, and had the following problems.

1) When scrolling, the display region is always copied, and a next continuous region is drawn in a blank region, and it is a wasteful process to copy the display region already existing in the map memory, and accordingly the scroll display becomes slow and the CPU load increases.

2) A memory region of map memory for drawing maps in a total of nine screen is needed.

3) If the own vehicle moves around the boundary of the judging region so that the reference point on the display screen moves, it is misjudged that the own vehicle is frequently moving in various direction, and map copying and drawing are executed frequently, and hence the CPU load increases.

SUMMARY OF THE INVENTION

A first aspect of the invention relates to a display method of navigation map using a navigation system, the navigation system comprising position information output means for outputting position information of an objective display point, memory means for map for storing map information in a predetermined memory region, in which the memory means for map divides the predetermined memory region into plural divided memory regions, and divided map information obtained by dividing the map information is stored individually in the plural divided memory regions, display means for displaying part of the map information stored in the memory means for map on a display screen, and control means for controlling the memory means for map and the display means on the basis of the position information, in which the control means recognizes the continuity of map regardless of physical position relation of the plural divided memory regions, and scrolls and displays part of the map information on the display screen so as to include the objective display point, the display method of navigation map comprising the steps of (a) dividing the predetermined memory region into plural judging regions, in which the plural judging regions are set so that the moving direction of the objective display point may be recognized at a point sufficient for displaying on the display screen without updating the content of the predetermined memory region, (b) recognizing the moving direction of the objective display point, on the basis of the position information which changes every minutes, by determining a judging region corresponding to the objective display region out of the plural judging regions and detecting changes of the judging region corresponding to the objective display point, and (c) recognizing a display object region which is a display object on the display screen and a display object off region out of display object, in the predetermined memory region, when the moving direction of the objective display point is recognized at the step (b), and updating the map information by writing map information specifying the map continuous along the moving direction of the objective display point to the map specified by the map information in the display objective region in the display object off region.

A second aspect of the invention relates to the display method of navigation map, wherein the plural divided memory regions are divided regions of the predetermined memory region in a matrix of N×M (N≧3, M≧3), and the information quantity of the divided map information stored in each one of the plural divided memory refions is same as the information quantity of map information displayed on the display screen, and the display object region is a first predetermined number of display divided memory regions subject to display on the display screen out of the plural divided memory regions, and the display object off region is a second predetermined number of display off divided regions not subject to display on the display screen out of the plural divided memory regions.

A third aspect of the invention relates to the display method of navigation map, wherein the map information has character information such as geographical names, and the character information is present within the divided map information corresponding to a character reference position corresponding to a character, the display method of navigation map, further comprising the step of (d) detecting character information in a detection objects, after updating process of the map information by the step (c), the detection objects being the display off divided memory regions and divided memory regions for storing map information specifying the map continuous to the map specified in map information in the display off divided memory regions out of the display divided memory regions, and writing the information of boundary characters which are characters to be located at the boundary of the display divided memory regions and display off divided memory regions, or the boundary of mutual display off divided memory regions when the second predetermined number is 2 or more, into a corresponding divided memory region.

A fourth aspect of the invention relates to the display method of navigation map, wherein the map information has character information such as geographical names, and the character information is present within the divided map information corresponding to a character reference position corresponding to a character, the display method of navigation map, further comprising the step of (d) detecting character information in a detection objects, after updating process of the map information of the step (c), the detection objects being divided map information specifying all maps continuous to the map specified in the divided map information stored in the display off divided memory regions, and writing boundary characters which are characters to be located at the boundary of the display divided memory regions and the display off divided memory regions, or the boundary of mutual display off divided memory regions when the second predetermined number is 2 or more, into a corresponding divided memory region.

A fifth aspect of the invention relates to the display method of navigation map, wherein the plural divided memory regions are divided regions of the predetermined memory region in a matrix of 2×2, the information quantity of the divided map information stored in each one of the plural divided memory regions is same as the information quantity of map information displayed on the display screen, the plural divided memory regions are plural partial divided memory regions divided in a matrix of K×L (K≧2, L≧2) respectively, and the plural partial divided memory regions each store partial divided map information obtained by further dividing the divided map information stored in corresponding divided memory regions, and the display object region is a first predetermined number of display partial divided memory regions subject to display on the display screen, out of the plural partial divided memory regions of each one of the plural divided memory regions, and the display off region is a second predetermined number of display off partial divided memory regions not subject to display on the display screen, out of the plural partial divided memory regions of each one of the plural divided memory regions.

A sixth aspect of the invention relates to the display method of navigation map, wherein the map information has character information such as geographical names, and the character information is present within the divided map information corresponding to a character reference position corresponding to a character, the display method of navigation map, further comprising the step of (d) detecting character information in a detection objects, after updating process of the map information of the step (c), the detection objects being the display off partial divided memory regions and partial divided memory regions for storing map information specifying the map continuous to the map specified in map information in the display off partial divided memory regions out of the display partial divided memory regions, and writing the information of boundary characters which are characters to be located at the boundary of the display partial divided memory regions and display off partial divided memory regions, or the boundary of mutual display off partial divided memory regions when the second predetermined number is 2 or more, into a corresponding partial divided memory region.

A seventh aspect of the invention relates to the display method of navigation map, wherein the map information has character information such as geographical names, and the character information is present within the divided map information corresponding to a character reference position corresponding to a character, the display method of navigation map, further comprising the step of (d) detecting character information in a detection objects, after updating process of the map information of the step (c), the detection objects being all partial divided map information specifying a map continuous to the map specified in the partial divided map information stored in the display off partial divided memory regions, and writing information of boundary characters which are characters to be located at the boundary of the display partial divided memory regions and the display off partial divided memory regions, or the boundary of mutual display off partial divided memory regions when the second predetermined number is 2 or more, into a corresponding divided partial memory region.

An eighth aspect of the invention relates to the display method of navigation map, wherein the plural judging regions are set variably on the basis of the position of the objective display point, so that a judging region corresponding to the objective display point may be always set larger.

In the display method of navigation map according to the first aspect of the invention, the plural judging regions set at the step (a) can recognize the moving direction of the objective display point at a point sufficiently possible to display on the display screen without updating the content in the predetermined memory region, and the map information updating process at the step (c) is to write into the display off region.

Therefore, without any effect on display on the display screen by the display means, the map information specifying the map along the moving direction of the objective display point can be written into the display off region.

As a result, without delaying the display on the display screen by the display means, it is possible to scroll and display quickly according to the move of the objective display point. Besides, the map information stored in the display region is also utilized after the map information updating process, it is not necessary to copy the map information stored in the display region into other region, so that the load on the control means is lessened.

In the display method of navigation map according to the second aspect of the invention, the plural divided memory regions are a predetermined memory region divided in a matrix of N×M (N≧3, M≧3), and the information quantity of divided map information stored in each one of the plural divided memory regions is same as the information quantity of the map information displayed on the display screen, and hence wherever the region subject to display on the display screen by the display means in the predetermined memory region, a divided memory region in a display off divided memory region is always present in the plural divided memory regions.

Therefore, without any effect on display on the display screen by the display means, the divided map information specifying the map along the moving direction of the objective display point can be written into the display off divided region.

As a result, without delaying the display on the display screen by the display means, it is possible to scroll and display quickly according to the move of the objective display point.

In the display method of navigation map according to the third aspect of the invention, after the map information updating process, the character information is detected in the display off divided memory regions and the display divided memory regions for storing the map information specifying the map continuous to the map specified by the map information in the display off divided memory regions, and the information of the boundary character which is the character to be located at the boundary of the display divided memory region and the display off divided memory regions, or the boundary of mutual display off divided memory regions when the second predetermined number is 2 or more.

Therefore, even in the divided memory region not having character information of boundary character, information of boundary character can be written, and the character on the boundary between divided memory regions can be displayed on the display screen without delay after map information updating process.

In the display method of navigation map according to the fourth aspect of the invention, after the map information updating process, character information is detected in the divided map information specifying all maps continuous to the map specified in the divided map information stored in the display off divided memory region, and the boundary character which is the character to be located at the boundary of the display divided memory region and display off divided memory region, or the boundary of mutual display off divided memory regions when the second predetermined number is 2 or more is written into the corresponding divided memory region.

Therefore, even in the divided memory region not having character information of boundary character, information of boundary character can be written, and the character on the boundary between divided memory regions can be displayed on the display screen without delay after map information updating process.

In the display method of navigation map according to the fifth aspect of the invention, the plural divided memory regions are divided regions in a matrix of 2×2, the information quantity of divided map information in each one of the plural divided memory regions is same as the information quantity of map information displayed on the display screen, and the plural divided memory regions are composed of plural partial divided memory regions divided in a matrix of K×L (K≧2, L≧2), and accordingly if the region subject to display on the display screen by the display means is at any position in the predetermined memory region, there always exists a partial divided memory region to be a display off partial divided memory region out of the plural partial divided memory regions.

Therefore, without any effect on display on the display screen by the display means, the partial divided map information specifying the map along the moving direction of the objective display point can be written into a display off partial divided memory region.

As a result, without delaying the display on the display screen by the display means, it is possible to scroll and display quickly according to the move of the objective display point.

Moreover, the plural divided memory regions are the predetermined memory region divided into a matrix of 2×2, and the memory capacity of the map memory means may be only four times the capacity of the region to be displayed on the display screen by the display means, so that the memory capacity of the map memory means may be kept to a minimum requirement.

In the display method of navigation map according to the sixth aspect of the invention, after the map information updating process, the character information is detected in the display off partial divided regions and the display partial divided memory regions for storing the map information specifying the map continuous to the map specified in the map information in the display off divided memory regions, and the information of boundary character which is the character to be located at the boundary of the display partial divided memory region and display off partial divided memory region between different divided memory regions, or the boundary of mutual display off partial divided memory regions between different divided memory regions if the second predetermined number is 2 or more is written into the corresponding partial divided memory region.

Therefore, even in the partial divided memory region not having character information of boundary character, information of boundary character can be written, and the character on the boundary of mutual partial divided memory regions between different divided memory regions can be displayed on the display screen without delay after map information updating process.

In the display method of navigation map according to the seventh aspect of the invention, after the map information updating process, the character information is detected in all partial divided map information specifying the map continuous to the map specified by the partial divided map information stored in the display off partial divided memory region, and the information of boundary character which is the character to be located at the boundary of the display partial divided memory region and display off partial divided memory region between different divided memory regions, or the boundary of mutual display off partial divided memory regions between different divided memory regions if the second predetermined number is 2 or more is written into the corresponding partial divided memory region.

Therefore, even in the partial divided memory region not having character information of boundary character, information of boundary character can be written, and the character on the boundary of mutual partial divided memory regions between different divided memory regions can be displayed on the display screen without delay after map information updating process.

In the display method of navigation map according to the eighth aspect of the invention, the plural judging regions are variably set according to the position of the objective display point so that the judging region corresponding to the position of the objective display point may be always set larger, and therefore the moving direction is not mistaken due to unstable move of the objective display point such as zigzag move of the objective display point on the boundary of the judging region, thereby enhancing the judging precision of moving direction of the objective display point.

As a result, wasteful process of map information updating is avoided, so that the load on the control means may be lessened.

It is therefore an object of the present invention to provide a display method of navigation map capable of scrolling quickly, and lessening the load of the control means such as CPU, thereby solving the problems of the prior art.

These and other objects, features, aspects and advantages of the present invention will become more apparent from the following description of the present invention when taken in conjunction with the accompanying drawings.

BRIEF DESCRIPTION OF THE DRAWINGS

FIG. 2 is an explanatory diagram showing an internal structure of a map memory used in a first preferred embodiment.

FIG. 3 is an explanatory diagram showing miracle scroll action of the map memory used in the first preferred embodiment.

FIG. 13 is an explanatory diagram showing the relation between reference page and page direction.

FIG. 14 is an explanatory diagram showing the relation between reference page and page direction supposing the reference page to be page 4.

FIG. 15 is an explanatory diagram showing an internal structure of a map memory used in a second preferred embodiment.

FIG. 16 is an explanatory diagram showing the detail of internal structure of the map memory used in the second preferred embodiment.

FIG. 17 is an explanatory diagram showing miracle scroll action of the map memory used in the second preferred embodiment.

FIG. 23 is an explanatory diagram showing the state of character present in the page boundary, and a state of character present in the boundary of data composition unit.

FIG. 24 is an explanatory diagram showing the relation between reference page and page direction.

FIG. 29 is an explanatory diagram schematically showing an example of a map.

FIG. 30 is an explanatory diagram showing a conventional map scrolling method.

FIG. 31 is an explanatory diagram showing a conventional map scrolling method.

FIG. 32 is an explanatory diagram showing a conventional map scrolling method.

FIG. 33 is an explanatory diagram showing a conventional map scrolling method.

FIG. 34 is an explanatory diagram showing a conventional map scrolling method.

FIG. 35 is an explanatory diagram showing a conventional map scrolling method.

FIG. 36 is an explanatory diagram showing a conventional map scrolling method.

FIG. 37 is an explanatory diagram showing a conventional map scrolling method.

DESCRIPTION OF THE PREFERRED EMBODIMENTS

<<System configuration>>

Figure 1:
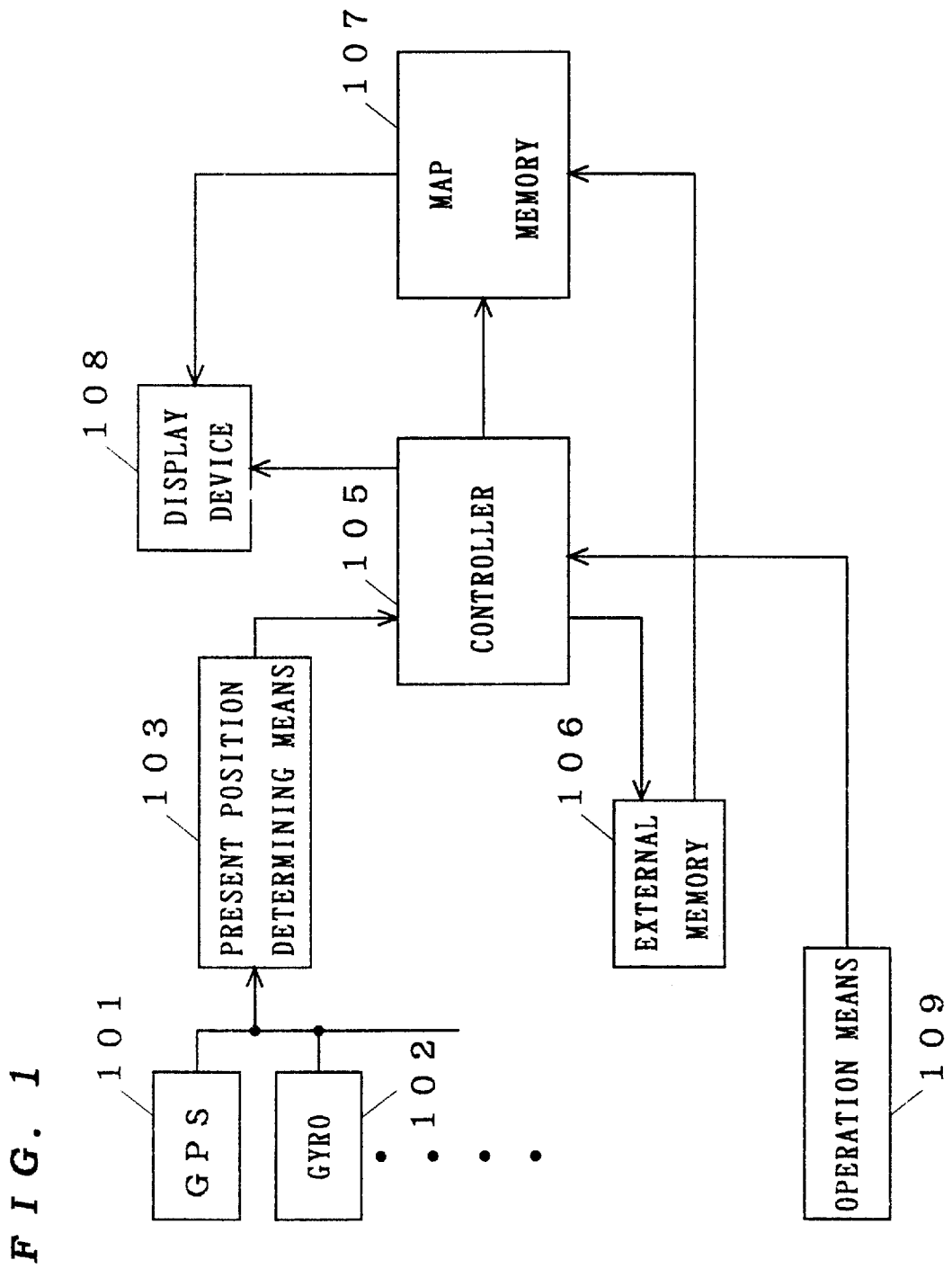
FIG. 1 is a block diagram showing a constitution of navigation system used in a preferred embodiment of the invention.

FIG. 1 is a block diagram showing an example of a constitution of a navigation system used in a preferred embodiment of the invention. In the diagram, a global positioning system (GPS) 101 outputs the position information of the own vehicle to present position detecting means 103. The position information is the information of the position of the own vehicle on a map, by using artificial satellite or the like, expressed in terms of latitude and longitude, difference from the reference point, etc. A gyro 102 outputs the moving direction information of the own vehicle to the present position detecting means 103.

The present position detecting means 103 determines the accurate present position of the own vehicle on the basis of the position information obtained from the GPS 101 and the moving direction information obtained from the gyro 102, and outputs determined position information to a controller 105.

The controller 105, on the basis of the determined position information, writes part of the map information of an external memory 106 into a map memory 107, or displays the map information obtained from the map memory 107 into a display device 108 so that the position of the own vehicle may be shown in the center of the screen as an objective display point.

The map memory 107 has a memory capacity worth plural screens of the display device 108, and desired information on the map memory 107 can be displayed on the display device 108 at high speed. The external memory 106 is a memory composed of memory means of large capacity such as a CD-ROM, and stores all information of the map that can be displayed by the navigation system.

Operation means 109 comprises keyboard and others, and is used for controlling start of operation and others of the controller 105. Besides, by applying determined position information from the operation means 109, the map can be scrolled on the display device 108.

<<First preferred embodiment>>
<Map memory>

FIG. 2 is an explanatory diagram showing a memory composition of the map memory 107 used in a display method of navigation map in a first preferred embodiment of the invention. As shown in the diagram, the map memory 107 has divided storing regions of map information in a total of nine screens consisting of three screens vertically and three screens laterally.

Figure 3:
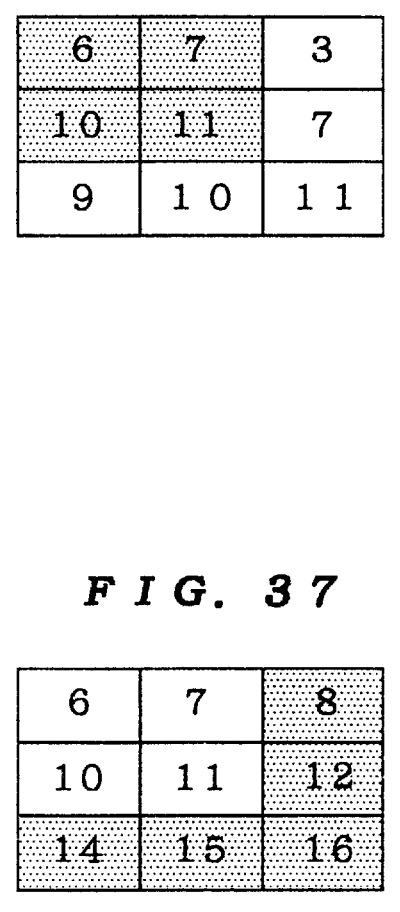

In the map memory 107, under control of the controller 105, as shown in FIG. 3, the upper ends (upper ends of screens 1, 2, 3) and lower ends (lower ends of screens 7, 8, 9), or left ends (left ends of screens 1, 4, 7) and right ends (right ends of screens 3, 6, 9) are consecutive, and hence miracle scroll can be displayed on the screen of the display device 108. The technique of miracle scroll is disclosed, for example, in Japanese Laid-open Patent No. 63-82318.

<General flow>

Figure 4:
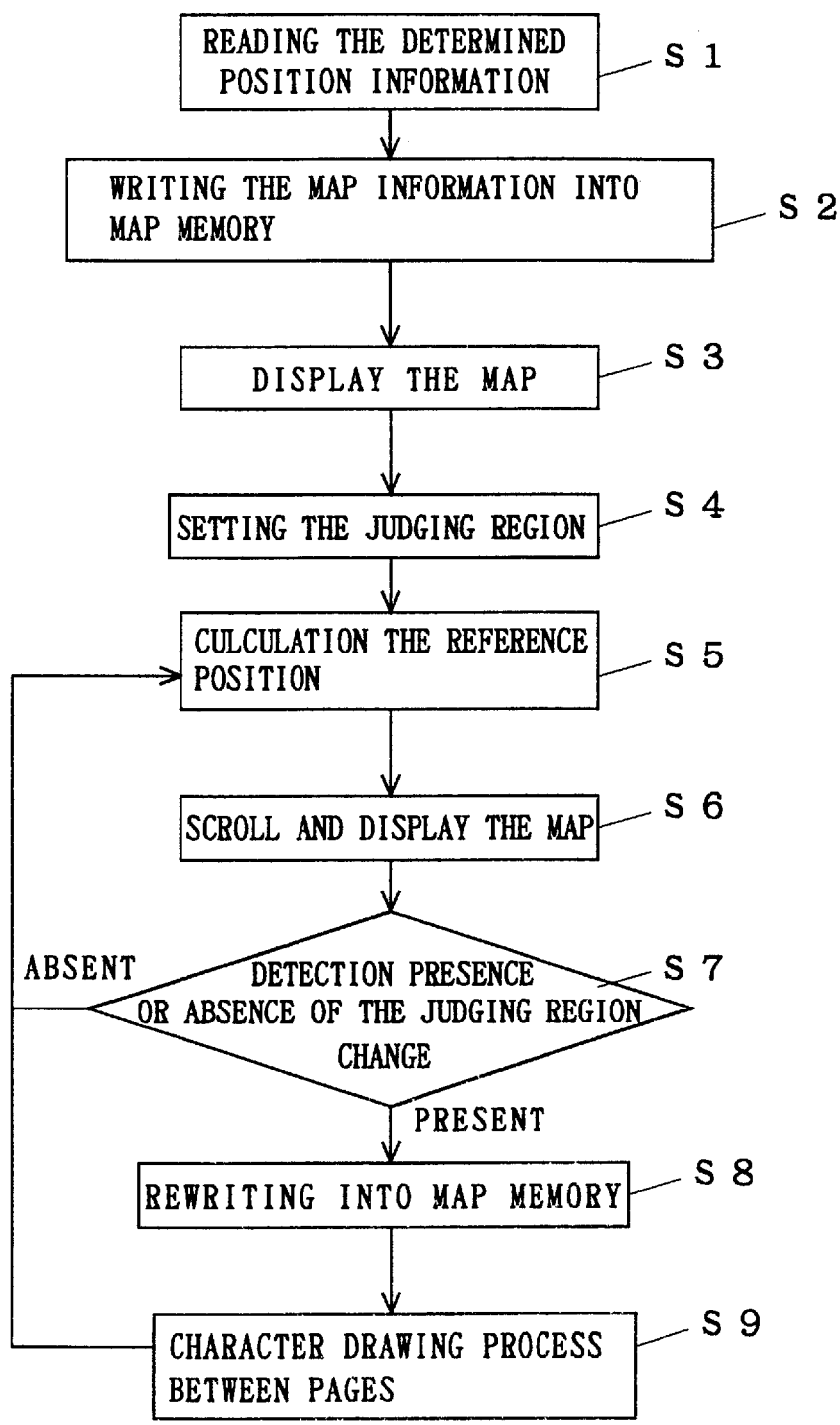
FIG. 4 is a flowchart showing a display method of navigation map in the first preferred embodiment.

FIG. 4 is a flowchart showing the display method of navigation map in the first preferred embodiment of the invention. The following steps are conducted under control of the controller 105.

Referring to the diagram, at step S1, determined position information is read in from the present position detecting means 103.

Figures 5, 6, 7:
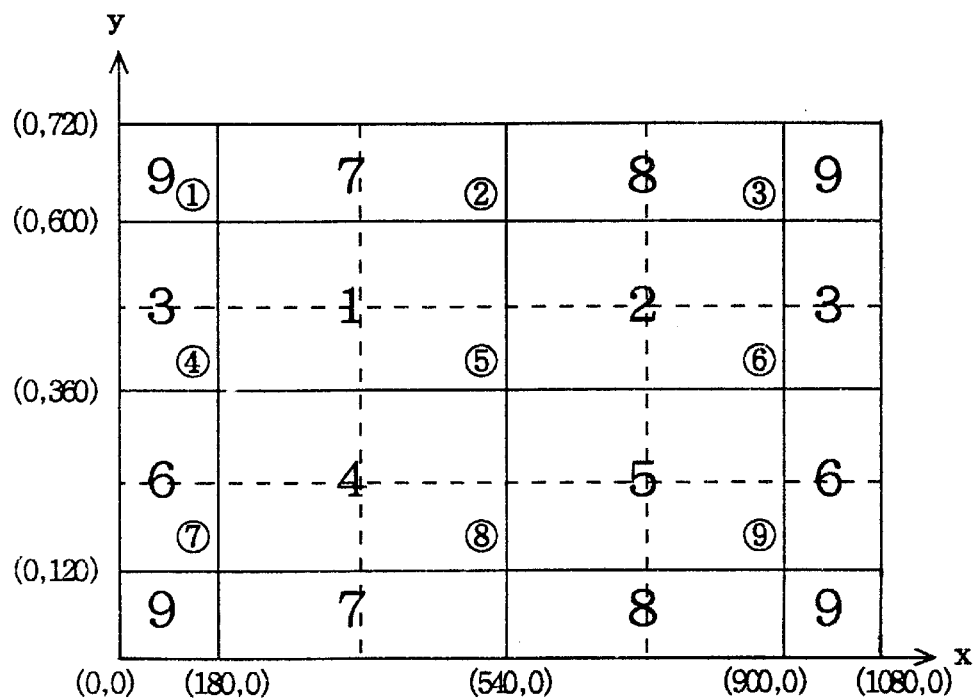
FIG. 5 is an explanatory diagram showing a page composition of the map memory used in the first preferred embodiment.
FIG. 6 is an explanatory diagram showing plural judging regions in the map memory used in the first preferred embodiment.
FIG. 7 is an explanatory diagram showing judging regions and page composition of the map memory used in the first preferred embodiment.

At step S2, on the basis of the determined position information, the map information of nine screens obtained from the external memory 106 is written into the map memory 107. In the map memory 107, as shown in FIG. 5, plural divided memory regions are assigned in the page unit corresponding to one screen of the display device 108, and each divided memory region stores the map information of one screen (divided map information). At this time, at step S2, the map information is written into the map memory 107 so that the divided map information at the position of the own vehicle is assigned in the divided memory regions of page 5.

At step S3, the controller 105 displays the map on the display device 108 so that the objective display point showing the position of the own vehicle in the middle, on the basis of the determined position information and map information stored in the map memory 107.

At step S4, as shown in FIG. 6, the map memory 107 is divided into plural judging regions. FIG. 7 is an explanatory diagram showing a detailed example of the plural judging regions shown in FIG. 6. In the example in FIG. 7, one screen of the display device 108 is composed of 360×240 pixels, and the coordinates position on the map memory 107 is set by the x-coordinate and y-coordinate calibrated in the unit of one pixel. In FIG. 7, numerals 1 to 9 refer to identification numbers of judging regions, circled numbers 1 to 9 denote page numbers of divided memory regions, the solid line indicates the boundary of judging regions, and the broken line represents the boundary of divided memory regions. For example, in FIG. 7, judging region 1 is a region enclosed by four points (180, 360), (540, 360), (540, 600), and (180, 600).

At step S5, on the basis of the determined position information, the reference position is calculated as the position coordinates on the map memory 107 corresponding to the upper left place of the screen of the display device 108. Incidentally, the reference position may be also set in the upper right, lower right, lower left, or center place of the screen, aside from the upper left place of the screen of the display device 108.

For example, initially, since the present position of the own vehicle is in the center of page 5, the upper left place (360, 480) of page 5, that is, the center of the judging region 1 is the reference position. As a matter of course, when the own vehicle moves, or the determined position information is changed by the operation means 109, the reference position varies accordingly.

At step S6, along with the change of the determined position information, the map is scrolled and displayed on the display device 108 so that the position of the own vehicle may be in the center.

Consequently, at step S7, by comparison of reference position and plural judging regions, it is checked if the judging region corresponding to the reference position is changed or not. When the judging position is changed, the operation goes to step S8, and if not changed, it returns to step S5.

At step S8, rewriting is processed into the map memory 107 as described later, and a character is drawn between pages at step S9 as described, and then the operation returns to step S5.

Thereafter, steps S5 to S7 (S8, S9) are repeated.

<Judging process>

Figure 8:
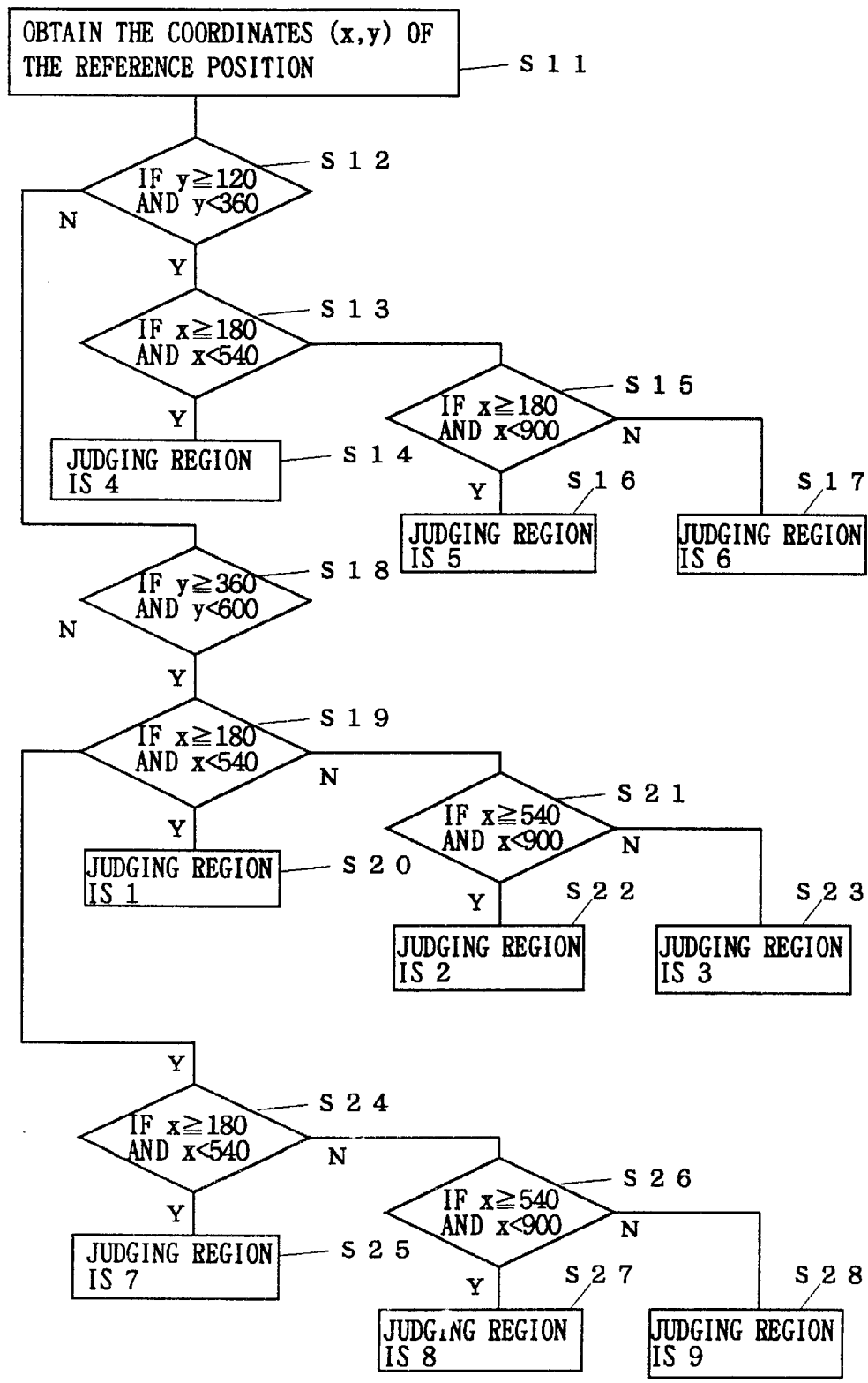
FIG. 8 is a flowchart showing a determining method of judging regions in the first preferred embodiment.

FIG. 8 is a flowchart showing the judging region determining process in detection process for presence or absence of judging region change at step S7 in FIG. 4. Herein, FIG. 8 shows the process when the page composition of the map memory 107 and plural judging regions are set as shown in FIG. 7.

Referring to the diagram, at step S11, the coordinates (x, y) of the reference position are obtained. At step S12, detecting if Y≧120 and Y<360, the operation goes to step S13 if YES, or step S18 if NO.

At step S13, detecting if x≧180 and x<540, if YES, judging region 4 (corresponding to divided memory region of page 8) is determined at step S14, and the operation goes to step S15 if NO.

At step S15, detecting if x≧540 and x<900, if YES, judging region 5 (corresponding to divided memory region of page 9) is determined at step S16, and if NO, judging region 6 (corresponding to divided memory region of page 7) is determined at step S17.

At step S18, detecting if y≧360 and y<600, the operation goes to step S19 if YES, and to step S21 if NO.

At step S19, detecting if x≧180 and x<540, if YES, judging region 1 (corresponding to divided memory region of page 5) is determined at step S20, and the operation goes to step S21 if NO.

At step S21, detecting if x≧540 and x<900, if YES, judging region 2 (corresponding to divided memory region of page 6) is determined at step S22, and if NO, judging region 3 (corresponding to divided memory region of page 4) is determined at step S23.

At step S24, detecting if x≧180 and x<540, if YES, judging region 7 (corresponding to divided memory region of page 2) is determined at step S25, and the operation goes to step S26 if NO.

At step S26, detecting if x≧540 and x<900, if YES, judging region 8 (corresponding to divided memory region of page 3) is determined at step S27, and if NO, judging region 9 (corresponding to divided memory region of page 1) is determined at step S28.

In this way, by comparison of reference position with coordinates of plural judging regions, any one of judging regions 1 to 9 corresponding to the reference position is determined.

Afterwards, the determined judging region and the judging region just before determination are compared, and presence or absence of a change of judging region is detected. If the judging region is changed, the preceding judging region JO and present judging region are transmitted to next step S8 as the information showing the moving direction of the objective display point.

<Rewriting process into map memory>

Figure 9:
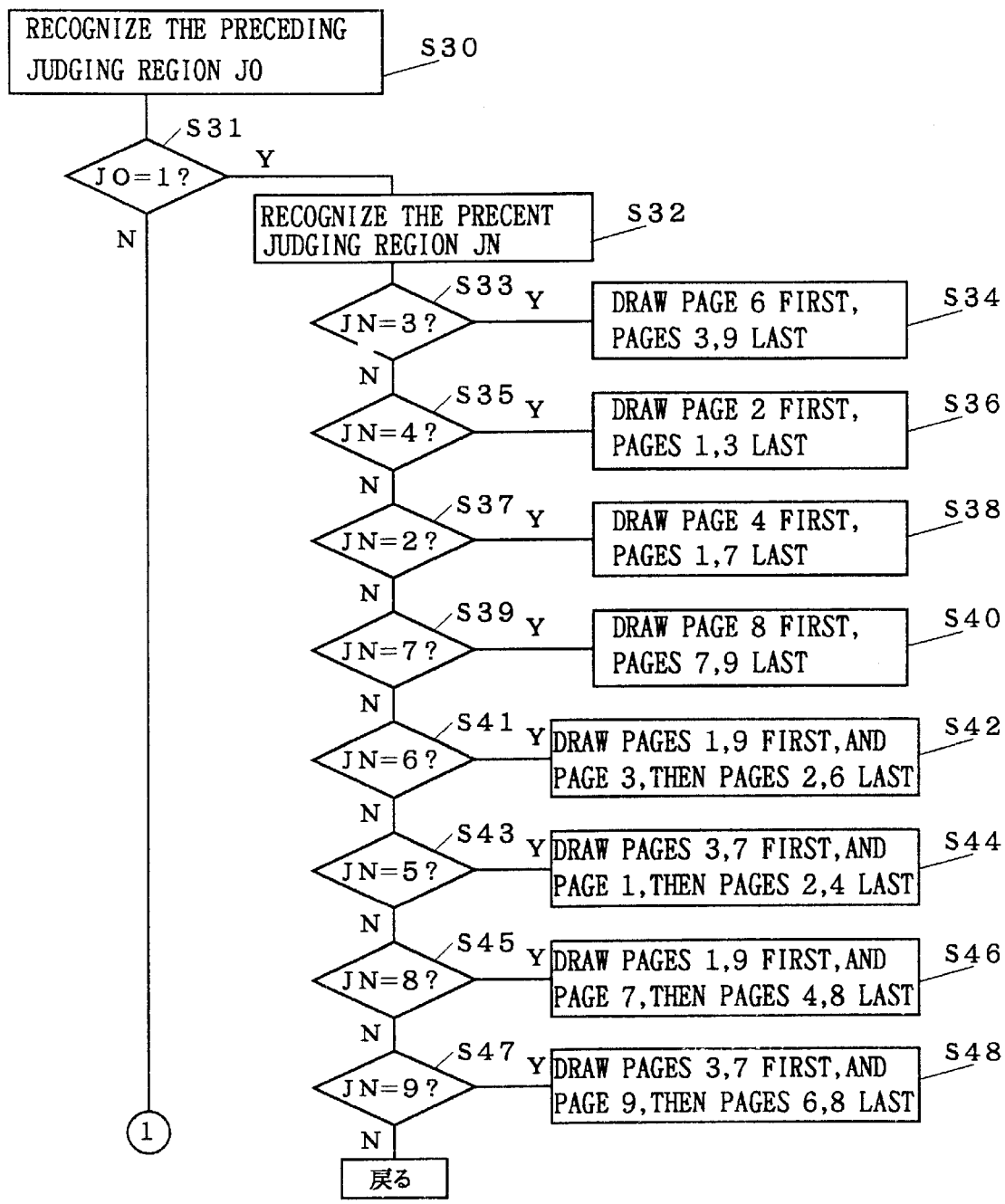
FIG. 9 is a flowchart showing a method of writing into the map memory in the event of change of judging region in the first preferred embodiment.
Figure 10:
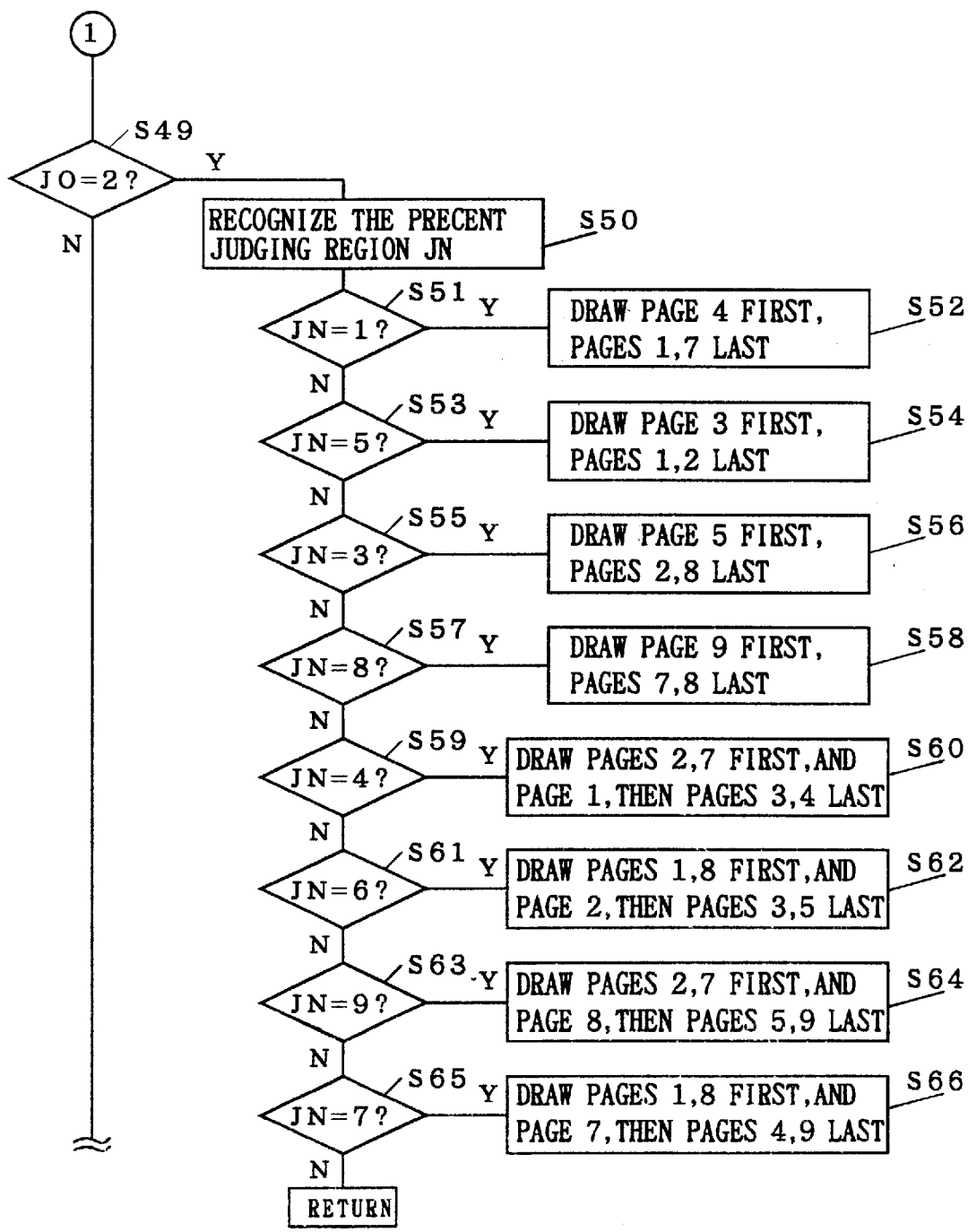
FIG. 10 is a flowchart showing a method of writing into the map memory in the event of change of judging region in the first preferred embodiment.

FIG. 9 and FIG. 10 are flowcharts showing the detail of rewriting process into the map memory 107 at step S8 in FIG. 4.

Referring to the diagrams, at step S30, the preceding judging region JO is recognized. At step S31, it is checked if the preceding judging region JO is judging region 1 or not, and the operation goes to step S32 if YES, or to step S49 if NO.

At step S32, the present judging region JN is recognized, and at step S33, it is checked if the present judging region JN is judging region 3 or not, and the operation goes to step S34 if YES, or to step S35 if NO. At step S34, rewriting is processed in the leftward change from judging region 1 to judging region 3, the divided memory region of page 6 of the map memory 107 is first written, then the divided memory regions in pages 3 and 9 are written.

At step S35, it is checked if the present judging region JN is judging region 4 or not, and the operation goes to step S36 if YES, or to step S37 if NO. At step S36, rewriting is processed in the downward change from judging region 1 to judging region 4, and the divided memory region of page 2 of the map memory 107 is first written, then the divided memory regions of pages 1 and 3 are written.

At step S37, checking if the present judging region JN is judging region 2 or not, the operation goes to step S38 if YES, or to step S39 if NO. At step S38, rewriting is processed in the rightward change from judging region 1 to judging region 2, and the divided memory region of page 4 of the map memory 107 is first written, then the divided memory regions of pages 1 and 7 are written.

At step S39, checking if the present judging region JN is judging region 7 or not, the operation goes to step S40 if YES, or to step S41 if NO. At step S40, rewriting is processed in the upward change from judging region 1 to judging region 7, and the divided memory region of page 8 of the map memory 107 is first written, then the divided memory regions of pages 7 and 9 are written.

At step S41, checking if the present judging region JN is judging region 6 or not, the operation goes to step S42 if YES, or to step S43 if NO. At step S42, rewriting is processed in the left downward change from judging region 1 to judging region 6, and the divided memory regions of pages 1 and 9 of the map memory 107 are first written, then the divided memory region of page 3 is written, and finally the divided memory regions of pages 2 and 6 are written.

At step S43, checking if the present judging region JN is judging region 5 or not, the operation goes to step S44 if YES, or to step S45 if NO. At step S44, rewriting is processed in the right downward change from judging region 1 to judging region 5, and the divided memory regions of pages 3 and 7 of the map memory 107 are first written, then the divided memory region of page 1 is written, and finally the divided memory regions of pages 2 and 4 are written.

At step S45, checking if the present judging region JN is judging region 8 or not, the operation goes to step S46 if YES, or to step S47 if NO. At step S46, rewriting is processed in the right upward change from judging region 1 to judging region 8, and the divided memory regions of pages 1 and 9 of the map memory 107 are first written, then the divided memory region of page 7 is written, and finally the divided memory regions of pages 4 and 8 are written.

At step S47, checking if the present judging region JN is judging region 9 or not, the operation goes to step S48 if YES, or the process is terminated if NO. At step S48, rewriting is processed in the left upward change from judging region 1 to judging region 9, and the divided memory regions of pages 3 and 7 of the map memory 107 are first written, then the divided memory region of page 9 is written, and finally the divided memory regions of pages 6 and 8 are written.

At step S49, checking if the preceding judging region JO is judging region 2 or not, steps S50 to S66 are processed if YES, and same as processing at steps S32 to S48, rewriting is processed on the map memory 107, corresponding to the present judging region JN.

When the preceding judging region JO is judging regions 3 to 9, although not shown, same as in processing at steps S31 to S48, and processing at steps S49 to S66, rewriting is processed on the map memory 107, corresponding to the preceding judging region JO and present judging region JN.

Figure 11:
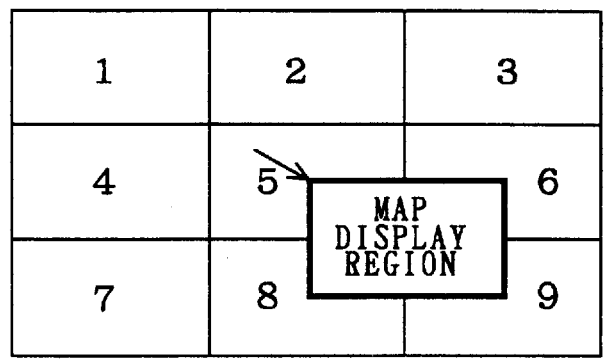
FIG. 11 is an explanatory diagram showing change of map display information shown in a display device.

An example is specifically described below. As shown in FIG. 11, the moment of changing from judging region 1 to judging region 5, the preceding judging region JO is judging region 1, and the present judging region JN is judging region 5, and a change in the right downward direction is recognized. At this time, the reference page is changed from page 5 to page 9. The reference page refers to the page in the divided memory region displaying the position of the own vehicle.

The divided memory regions of page numbers 1, 2, 3, 4, 7 shown in FIG. 11 are out of the scope of display of the display device 108, and are hence recognized as display off divided memory regions, whereas divided memory regions of page numbers 5, 6, 8, 9 shown in FIG. 11 are subject to display in the display device 108, and are hence recognized as display divided memory regions. Consequently, the map information of regions of circled numbers 1, 2, 3, 4, 7 shown in FIG. 12, which is the divided map information defining the map continuous along the right downward direction to the map defined by the map information stored in the display divided memory regions (pages 5, 6, 8, 9) is respectively written into the display off divided memory regions (pages 1, 2, 3, 4, 7).

At this time, the priority order of writing is in the sequence of pages 3, 7, page 1, and pages 4, 7 from the highest possibility of move of the own vehicle.

In the flow shown in FIG. 9 and FIG. 10, the branching process at steps S31 and S43 is YES, and step S44 is processed. FIG. 13 shows the page direction relative to the reference page, and FIG. 14 shows the page numbers corresponding to each page direction supposing page 9 to be the reference page.

Explaining in terms of reference page and page direction, processing at step S44 in FIG. 9 is as follows.

Seeing from page 9, that is, reference page, first the map information in page direction 7 is written into the divided memory region of page 3 of page direction 7, and the map information in page direction 5 is written into the divided memory region of page 7 in page direction 5, then the map information in page direction 8 is written into the divided memory region of page 1 in page direction 8, and finally the map information in page direction 6 is written into the divided memory region of page 2 in page direction 6 and the map information in page direction 3 is written into the divided memory region of page 5 in page direction 3.

In this way, by comparison between the preceding judging region JO and present judging region JN, the changing direction of the judging regions is recognized, and rewriting is processed in advanced on the page (display off divided memory region) out of the map display region of the display device 108 and in the map memory 107 low in possibility of being displayed henceforth. At this time, rewriting is processed by priority in the divided memory region of the page high in the possibility of moving of the own vehicle and that must be written at the earliest opportunity.

Therefore, unlike the prior art, there is no process of copying the map display region, and hence the load of the controller 105 (CPU) is lessened. Besides, since a rewriting process is always done on the display off divided memory region outside the map display region, display by the display device 108 is not delayed by the rewriting process. Accordingly, as the map information specifying the map along the moving direction of the own vehicle is written in the divided memory region outside the display area in advance by the rewriting process, the screen can be scrolled and displayed quickly according to the move of the own vehicle.

In addition, by rewriting by priority in the divided memory region of the page of high possibility of moving of the own vehicle and that must be written at the earliest opportunity, the map information can be always displayed instantly in the map memory 107 even if the own vehicle moves very fast, so that map display of high response is realized.

<Character drawing process between pages (1)>

Usually, the character information such as geographical names in the map information is provided independently of other information in the external memory 106. The position of a character defined by character information on the map is controlled by the character reference point (coordinates of upper left position of character, etc.).

Figures 21, 22:
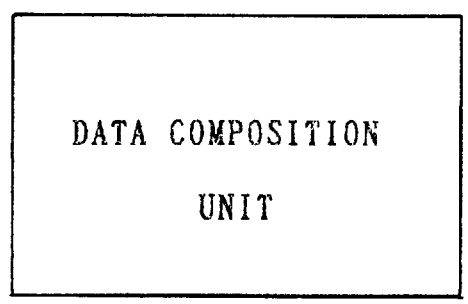
FIG. 21 is an explanatory diagram showing page assignment change of map memory before and after change of judging regions.
FIG. 22 is an explanatory diagram showing the relation between data composition unit and page composition.

Inside the external memory 106, as shown in FIG. 22, divided memory regions of four pages may be stored as one data composition unit. In the case of character C1 shown in FIG. 23, for example, a character drawn in plural pages but present in a same data composition unit has the character reference point of character C1 in any one page in the data composition unit, and therefore part of the character in the page can be drawn if any page within the same data composition unit is drawn.

On the other hand, in the case of character C2 in FIG. 23, if the character is present on the boundary of the data composition unit, there is a possibility of defect of drawing part of the character only in the page in which the character reference point exists. Hereinafter, the data composition unit is explained as one page.

If the judging region is changed in the composition of the map memory 107 in the first preferred embodiment, the boundary character to be located on the page boundary between the page not changed before and after change (display divided memory region) and the page rewritten after change (display off divided memory region), or the boundary character located on the boundary of display off divided memory regions if there are two or more display off divided memory regions must be drawn without problem.

In character drawing process between pages (1), it is intended to draw an overrunning portion whichever page the character reference point is in, if a character having a character reference point in the presently drawn (rewritten) page is overrunning in a page in which a character is already drawn or another page drawn at the present, or if an already drawn character is overrunning into the present page.

At this time, by the comparison between the preceding judging region JO and present judging region JN, the moving direction of the judging region is recognized, and the character is drawn by priority in the divided memory region of high possibility of moving of the own vehicle and that must be written at the earliest opportunity.

Figure 12:
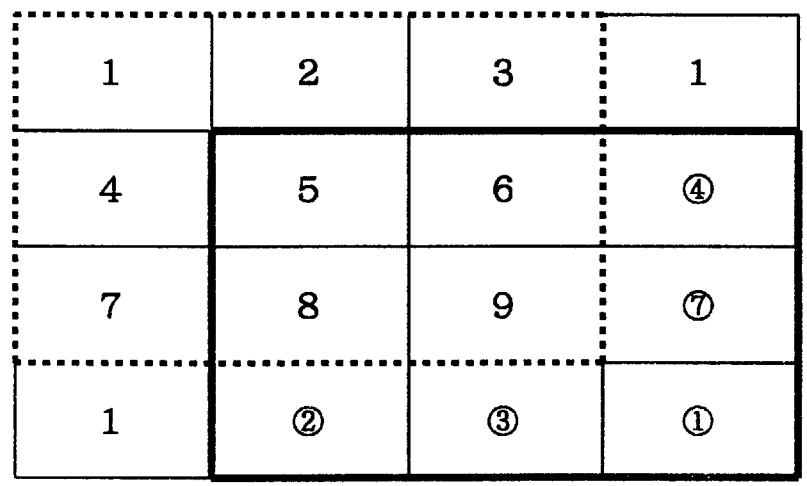
FIG. 12 is an explanatory diagram showing page assignment change of map memory before and after change of judging regions.

Hereinafter, supposing one data composition unit as one page unit, the character drawing processing between pages (1) is explained by referring to an example of change of judging region from judging region 1 to judging region 5 as shown in FIG. 11 and FIG. 12.

In this case, page 9 (its divided memory region) is the central page, and when a character of which character reference point is located in page 1 is overrunning to the central page, the overrunning portion is drawn in the central page, when a character of which character reference point is located in page 2 is overrunning to the central page, the overrunning portion is drawn in the central page, when a character of which character reference point is located in page 3 is overrunning to the central page, the overrunning portion is drawn in the central page, when a character of which character reference point is located in page 4 is overrunning to the central page, the overrunning portion is drawn in the central page, or when a character of which character reference point is located in page 7 is overrunning to the central page, the overrunning portion is drawn in the central page.

Supposing page 3 (its divided memory region) to be the central page, when a character of which character reference point is located in page 1 is overrunning to the central page, the overrunning portion is drawn in the central page, when a character of which character reference point is located in page 2 is overrunning to the central page, the overrunning portion is drawn in the central page, when a character of which character reference point is located in page 7 is overrunning to the central page, the overrunning portion is drawn in the central page, when a character of which character reference point is located in page 8 is overrunning to the central page, the overrunning portion is drawn in the central page, or when a character of which character reference point is located in page 9 is overrunning to the central page, the overrunning portion is drawn in the central page.

Supposing page 7 (its divided memory region) to be the central page, when a character of which character reference point is located in page 1 is overrunning to the central page, the overrunning portion is drawn in the central page, when a character of which character reference point is located in page 3 is overrunning to the central page, the overrunning portion is drawn in the central page, when a character of which character reference point is located in page 4 is overrunning to the central page, the overrunning portion is drawn in the central page, when a character of which character reference point is located in page 6 is overrunning to the central page, the overrunning portion is drawn in the central page, or when a character of which character reference point is located in page 9 is overrunning to the central page, the overrunning portion is drawn in the central page.

Supposing page 1 (its divided memory region) to be the central page, when a character of which character reference point is located in page 3 is overrunning to the central page, the overrunning portion is drawn in the central page, when a character of which character reference point is located in page 7 is overrunning to the central page, the overrunning portion is drawn in the central page, or when a character of which character reference point is located in page 9 is overrunning to the central page, the overrunning portion is drawn in the central page.

Supposing page 8 (its divided memory region) to be the central page, when a character of which character reference point is located in page 2 is overrunning to the central page, the overrunning portion is drawn in the central page, or when a character of which character reference point is located in page 3 is overrunning to the central page, the overrunning portion is drawn in the central page.

Supposing page 2 (its divided memory region) to be the central page, when a character of which character reference point is located in page 3 is overrunning to the central page, the overrunning portion is drawn in the central page, when a character of which character reference point is located in page 8 is overrunning to the central page, the overrunning portion is drawn in the central page, or when a character of which character reference point is located in page 9 is overrunning to the central page, the overrunning portion is drawn in the central page.

Supposing page 4 (its divided memory region) to be the central page, when a character of which character reference point is located in page 6 is overrunning to the central page, the overrunning portion is drawn in the central page, when a character of which character reference point is located in page 7 is overrunning to the central page, the overrunning portion is drawn in the central page, or when a character of which character reference point is located in page 9 is overrunning to the central page, the overrunning portion is drawn in the central page.

In this example, as the priority order of the central pages, the first is page 9, the second is pages 3 and 7, the third is page 1, the fourth is pages 6 and 8, and the fifth is pages 2 and 4.

<Character drawing process between pages (2)>

The character processing process between pages (2) is intended to draw the overrunning portion when a character of which character reference point is present in all surrounding pages of the presently drawn (rewritten) page is overrunning into the presently drawn page.

At this time, by the comparison between the preceding judging region JO and present judging region JN, the moving direction of the judging region is recognized, and the character is drawn by priority in the divided memory region of high possibility of moving of the own vehicle and that must be written at the earliest opportunity.

Hereinafter, supposing one data composition unit as one page unit, the character drawing processing between pages (1) is explained by referring to an example of change of judging region from judging region 1 to judging region 5 as shown in FIG. 11 and FIG. 12.

In this case, supposing page 3 (its divided memory region) to be the central page, when a character of which character reference point is in a page (page 9) located above the central page is overrunning to the central page, the overrunning portion is drawn in the central page, when a character of which character reference point is in a page (page 7) located right above the central page is overrunning to the central page, the overrunning portion is drawn in the central page, when a character of which character reference point is in a page (page 1) located right of the central page is overrunning to the central page, the overrunning portion is drawn in the central page, when a character of which character reference point is in a page located right below the central page is overrunning to the central page, the overrunning portion is drawn in the central page, when a character of which character reference point is in a page located below the central page is overrunning to the central page, the overrunning portion is drawn in the central page, when a character of which character reference point is in a page located left below the central page is overrunning to the central page, the overrunning portion is drawn in the central page, when a character of which character reference point is in a page (page 2) located left of the central page is overrunning to the central page, the overrunning portion is drawn in the central page, or when a character of which character reference point is in a page (page 8) located left above the central page is overrunning to the central page, the overrunning portion is drawn in the central page.

Hereinafter, supposing the divided memory regions of page 7, page 1, page 2, page 3 respectively to be the central pages, when the character of which character reference point located above, right above, right, right below, below, left below, left, or left above is overrunning to the central page, the overrunning portion is drawn in the central page.

In the above example, as the priority order of central pages, the first is pages 3 and 7, second is page 1, and third is pages 2 and 4.

<Others>

In the first preferred embodiment, the map memory 107 is composed of 3×3 divided memory regions, but not limited to this, the same effects are obtained as far as the map memory 107 is divided in a matrix of N×M (N≧3, M≧3) and is composed of divided memory regions.

<<Second preferred embodiment>>

<Map memory>

FIG. 15 is an explanatory diagram showing a memory composition of the map memory 107 used in the display method of navigation map in a second preferred embodiment of the invention. As shown in the diagram, the map memory 107 has divided memory regions (pages 1 to 4) of map information for a total of four screens of two screens vertically and two screens laterally.

Each one of the divided memory regions (pages 1 to 4) is further divided into partial divided memory regions detailed pages 1-1 to 1-4, 2-1 to 2-4, 3-1 to 3-4, and 4-1 to 4-4) see FIG. 16.

In the map memory 107, under control of the controller 105, as shown in FIG. 17, the upper ends (upper ends of screens 1, 2) and lower ends (lower ends of screens 3, 4), or left ends (left ends of screens 1, 3) and right ends (right ends of screens 2, 4) are consecutive, and hence miracle scroll can be displayed on the screen of the display device 108.

<General flow>

Figure 18:
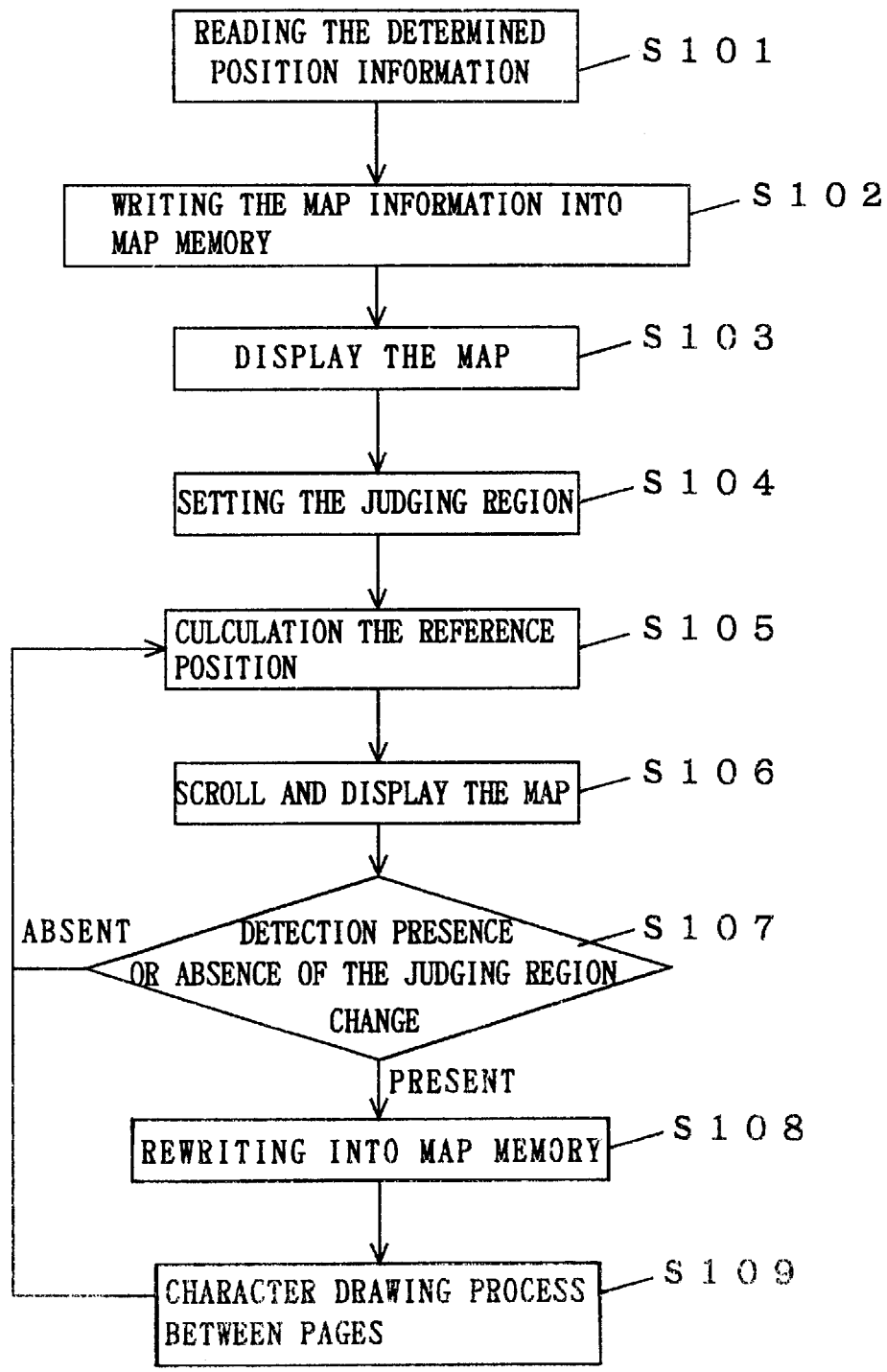
FIG. 18 is a flow chat showing a display method of navigation map in the second preferred embodiment.

FIG. 18 is a flowchart showing the display method of navigation map in a second preferred embodiment of the invention.

Referring to the diagram, at step S101, determined position information is read in from present position detecting means 103.

At step S102, on the basis of the determined position information, the map information for four screens obtained from the external memory 106 is written into the map memory 107. In the map memory 107, as shown in FIG. 16, plural divided memory regions are assigned in the page unit corresponding to one screen of the display device 108, and each divided memory region stores the map information (divided map information) for one screen. Moreover, each divided memory region is divided into 2×2 partial divided memory regions. Therefore, in the map memory 107, the partial divided memory regions are assigned in 16 regions consisting of detailed pages 1-1 to 1-4, 2-1 to 2-4, 3-1 to 3-4, 4-1 to 4-4. Each partial divided memory region stores the partial divided map information, which is the divided map information further divided into four divisions. At step S102, the map information is written into the map memory 107 so that the map information at the position of the own vehicle may be assigned in any one of the partial divided memory regions of page 1-4, page 2-3, page 3-2, and page 4-1.

At step S103, the controller 103 displays the map on the display device 108 so that the position of the own vehicle may be in the center, on the basis of the determined position information and map information stored in the map memory 107.

Figures 19, 20:
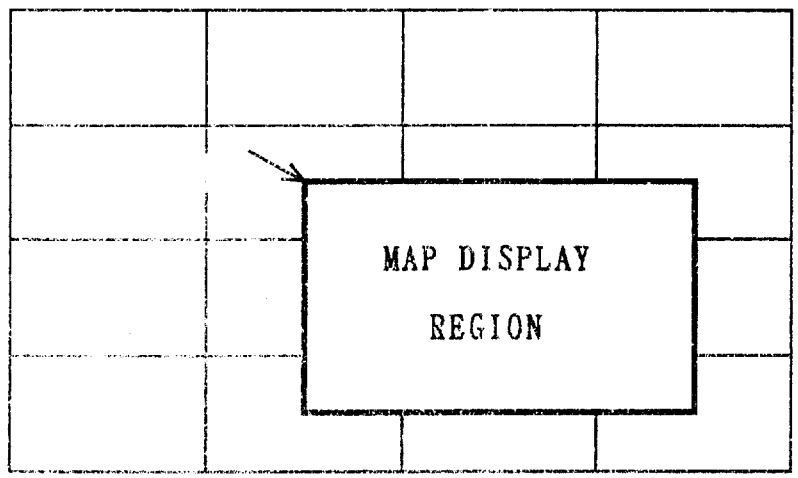
FIG. 19 is an explanatory diagram showing plural judging regions in the map memory used in the second preferred embodiment.
FIG. 20 is an explanatory diagram showing change of map display information shown in a display device.

At step S104, the judging region on the map memory 107 is set as shown in FIG. 19. The size of each judging region corresponds to the size of one partial divided memory region.

At step S105, on the basis of the determined position information, the reference position in the coordinates of the upper left position is calculated on the screen of the display device 108. The reference position may be set, aside from the upper left position on the screen of the display device 108, also in the upper right, lower right, lower left, or central position.

For example, initially, when the present position of the own vehicle is located in the center of the partial divided memory region of page 1-4, page 2-3, page 3-2, and page 4-1, the center of the judging region 1 is the reference position. As a matter of course, when the own vehicle moves or when the determined position information varies by the operation means 109, the reference position varies accordingly.

At step S106, along with the change of the determined position information, the map is scrolled and displayed on the display device 108 so that the position of the own vehicle may come in the center.

At step S107, by comparison between the reference position and plural judging regions, it is checked whether the judging position of the reference position is changed or not. When the judging region is changed, the operation goes to step S108, and if not changed, back to step S105.

At step S108, by rewriting into the map memory 107 as mentioned below, the character drawing between pages is processed as mentioned later at step S109, and the operation returns to step S105.

Thereafter, steps S105 to S107 (S108, S109) are repeated.

<Judging process>

In the second preferred embodiment, too, the judging region is judged by the comparison of coordinates between the reference position and judging region, same as in the flowchart of the first preferred embodiment shown in FIG. 8. However, in the first preferred embodiment, the judging region is set in the unit of one page (one divided memory region unit), but in the second preferred embodiment, the judging region is set in the unit of detailed page (¼ page) (one partial divided memory region unit). Therefore, as shown in FIG. 19, there are 16 judging regions.

That is, by the comparison of coordinates between the reference position and plural judging regions, the judging region corresponding to the reference position is determined to be any one of the judging regions 1 to 16.

Afterwards, comparing the determined judging region and the judging region immediately before determining are compared, and presence or absence of change of judging region is detected. When the judging region is changed, the preceding judging region JO is determined, and the present judging region JN is transmitted to the next step S108.

<Rewriting process into map memory>

Rewriting process into the map memory shown at step S108 is to recognize the changing direction of judging region by comparison between the preceding judging region JO and present judging region JN, same as the rewriting process of the first preferred embodiment shown in FIG. 9 and FIG. 10.

An example is specifically described below. As shown in FIG. 20, the moment judging region 1 is changed to judging region 6 due to change of map display region on the display device 108, the preceding judging region JO is judging region 1 and the present judging region JN is judging region 6, and change in the right below direction can be recognized. At this time, the reference page is page 4, and the detailed reference page is page 4-1. In the second preferred embodiment, the reference page refers to the page of the divided memory region displaying the present position of the own vehicle, and the detailed reference page means the detailed page of the divided memory region displaying the present position of the own vehicle.

At this time, partial divided memory regions of detailed page numbers 1-1 to 1-3, 2-1, 2-2, 3-1, and 3-3 are completely regarded out of display scope, and the map information of the regions to be displayed next is written into the partial divided memory region of these detailed pages. That is, the map information of the regions (1-3), (3-1), (3-3), (1-1), (2-2), (2-1), and (1-2) is written into the partial divided memory regions of detailed page numbers 1-3, 3-1, 3-3, 1-1, 2-2, 2-1, and 1-2 in the map memory 107.

The priority order of writing ranges from highest possibility of move of the own vehicle, in the sequence of pages 2-1, 2-2, 3-1, 3-3, next page 101, and finally pages 1-2, 1-3. If the detailed pages are different, the page unit can be written in batch in the partial divided memory region of the same priority and same page.

Therefore, in the shown example, when changed from judging region 1 to judging region 6, batch writing is processed in detailed pages 2-1 and 2-2, batch writing is processed in detailed pages 3-1 and 3-3, writing is processed in detailed page 1-1, and batch writing is processed in detailed pages 1-2 and 1-3.

FIG. 24 shows the page numbers corresponding to the reference page and page directions. Explaining in terms of reference page and page direction, when changed from judging region 1 to judging region 6 in the above example, page 4-4 is the reference page 1, and batch writing is processed in detailed pages 2-1 and 22 positioned in page directions 7-1 and 7-2, batch writing is processed in detailed pages 3-1 and 3-3 positioned in page directions 5-1 and 5-3, writing is processed in detailed page 1-1 positioned in page direction 8-1, and batch writing is processed in detailed page 1-3 positioned in page direction 3-3.

In this way, by comparison between the preceding judging region JO and present judging region JN, the changing direction of judging region is recognized, and rewriting is processed in advanced in detailed page (partial divided memory region out of display scope) in the map memory 107 which is outside the map display region of the display device 108 and is low in possibility of display henceforth, and at this time, rewriting is processed by priority into the partial divided memory region of the detailed page that is high in possibility of move of the own vehicle and must be written at the earliest opportunity.

Therefore, unlike the prior art, there is no process of copying the map display region, and hence the load of the controller 105 (CPU) is lessened. Besides, since a rewriting process is always done on the display off partial divided memory region outside the map display region, display of the display device 108 is not delayed by the rewriting process. Accordingly, as the map information specifying the map along the moving direction of the own vehicle is written in the partial divided memory region outside the display area in advance by rewriting process, the screen can be scrolled and displayed quickly according to the move of the own vehicle.

In addition, by rewriting by priority in the partial divided memory region of the page of high possibility of moving of the own vehicle and that must be written at the earliest opportunity, the map information can be always displayed instantly in the map memory 107 even if the own vehicle moves very fast, so that map display of high response is realized.

Moreover, by composing so as to access to the map memory 107 in the unit of partial divided memory region which is a further divided portion of the divided memory region, the total capacity of the map memory 107 can be suppressed to the portion of four pages (capacity of divided memory region×4), and hence as compared with the capacity worth nine pages in the first preferred embodiment, the capacity of the map memory 107 can be reduced substantially.

<Character drawing process between pages (1)>

When the judging region is changed in the composition of the map memory 107 in the second preferred embodiment, it is necessary to draw properly the boundary character to be located at the boundary of the page not altered before and after the change (display partial divided memory region) and the page rewritten after change (display off partial divided memory region), or the boundary character located at the boundary of mutual display off partial divided memory regions, same as in the first preferred embodiment when there are two or more display off partial divided memory regions.

The character drawing process between pages (1) is a process intended to draw an overrunning portion whichever page the character reference point is in, if a character having a character reference point in the presently drawn (rewritten) page is overrunning in a page in which a character is already drawn or other page drawn at the present, or if an already drawn character is overrunning into the presently page.

At this time, by the comparison between the preceding judging region JO and present judging region JN, the moving direction of the judging region is recognized, and the character is drawn by priority in the divided memory region of high possibility of moving of the own vehicle and that must be written at the earliest opportunity.

However, since a character located at the boundary of detailed page of same page can be easily drawn, it is out of the character drawing process unless the boundary of the central page and detailed page is the boundary of pages. That is, the object of drawing is only the boundary character to be located at the boundary of the detailed page and central page between different pages.

Hereinafter, same as in the first preferred embodiment, supposing one data composition unit as one page unit, the character drawing processing between pages (1) is explained by referring to an example of change of judging region from judging region 1 to judging region 6 as shown in FIG. 20.

In this case, pages 4-2 to 4-4 of page 4 (their partial divided memory regions) are the central page, and when a character of which character reference point is located in page 1-2 is overrunning to the central page, the overrunning portion is drawn in the central page, when a character of which character reference point is located in page 304 is overrunning to the central page, the overrunning portion is drawn in the central page, when a character of which character reference point is located in pages 4-3 and 4-4 is overrunning to the central page, the overrunning portion is drawn in the central page, when a character of which character reference point is located in page 3-3 is overrunning to the central page, the overrunning portion is drawn in the central page, or when a character of which character reference point is located in page 1-1 is overrunning to the central page, the overrunning portion is drawn in the central page.

Supposing pages 2-1 and 2-2 of page 2 (their partial divided memory regions) to be the central page, when a character of which character reference point is located in page 1-2 is overrunning to the central page, the overrunning portion is drawn in the central page, when a character of which character reference point is located in page 3-4 is overrunning to the central page, the overrunning portion is drawn in the central page, when a character of which character reference point is located in pages 4-3 and 4-4 is overrunning to the central page, the overrunning portion is drawn in the central page, when a character of which character reference point is located in page 3-3 is overrunning to the central page, the overrunning portion is drawn in the central page, or when a character of which character reference point is located in page 1-1 is overrunning to the central page, the overrunning portion is drawn in the central page.

Supposing pages 3-1 and 3-3 of page 3 (their partial divided memory regions) to be the central page, when a character of which character reference point is located in page 1-3 is overrunning to the central page, the overrunning portion is drawn in the central page, when a character of which character reference point is located in page 2-4 is overrunning to the central page, the overrunning portion is drawn in the central page, when a character of which character reference point is located in pages 4-2 and 4-4 is overrunning to the central page, the overrunning portion is drawn in the central page, when a character of which character reference point is located in page 2-2 is overrunning to the central page, the overrunning portion is drawn in the central page, or when a character of which character reference point is located in page 1-1 is overrunning to the central page, the overrunning portion is drawn in the central page.

Supposing page 1-1 (its partial divided memory region) to be the central page, when a character of which character reference point is located in page 3-3 is overrunning to the central page, the overrunning portion is drawn in the central page, when a character of which character reference point is located in page 4-4 is overrunning to the central page, the overrunning portion is drawn in the central page, or when a character of which character reference point is located in page 2-2 is overrunning to the central page, the overrunning portion is drawn in the central page.

Supposing page 2-4 (its partial divided memory region) to be the central page, when a character of which character reference point is located in page 1-3 is overrunning to the central page, the overrunning portion is drawn in the central page, or when a character of which character reference point is located in page 3-1 is overrunning to the central page, the overrunning portion is drawn in the central page.

Supposing page 3-4 (its partial divided memory region) to be the central page, when a character of which character reference point is located in page 1-2 is overrunning to the central page, the overrunning portion is drawn in the central page, or when a character of which character reference point is located in page 2-1 is overrunning to the central page, the overrunning portion is drawn in the central page.

Supposing page 1-2 (its partial divided memory region) to be the central page, when a character of which character reference point is located in page 3-4 is overrunning to the central page, the overrunning portion is drawn in the central page, when a character of which character reference point is located in page 4-3 is overrunning to the central page, the overrunning portion is drawn in the central page, or when a character of which character reference point is located in page 2-1 is overrunning to the central page, the overrunning portion is drawn in the central page.

Supposing page 1-3 (its partial divided memory region) to be the central page, when a character of which character reference point is located in page 2-4 is overrunning to the central page, the overrunning portion is drawn in the central page, when a character of which character reference point is located in page 4-2 is overrunning to the central page, the overrunning portion is drawn in the central page, or when a character of which character reference point is located in page 3-1 is overrunning to the central page, the overrunning portion is drawn in the central page.

In this example, as the priority order of the central pages, the first is pages 4-1 to 4-4, the second is pages 2-2 and 3-3, the third is page 1-1, the fourth is pages 2-4 and 3-4, and the fifth is pages 1-2 and 1-3.

<Character drawing process between pages (2)>

The character processing process between pages (2) is intended to draw the overrunning portion when a character of which character reference point is present in detailed pages around the central pages which are all the presently drawn (rewritten) pages is overrunning into the presently drawn detailed page. However, the surrounding detailed pages not at the boundary of the central page and page unit are out of scope of drawing. That is, the object of drawing is only the boundary character located at the boundary of the detailed page and central page between different pages.

At this time, by the comparison between the preceding judging region JO and present judging region JN, the moving direction of the judging region is recognized, and the character is drawn by priority in the divided memory region of high possibility of moving of the own vehicle and that must be written at the earliest opportunity.

Hereinafter, supposing one data composition unit as one page unit, the character drawing processing between pages (1) is explained by referring to an example of change of judging region from judging region 1 to judging region 6 as shown in FIG. 20.

In this case, supposing pages 2-1 and 2-2 (their partial divided memory regions) to be the central page, when a character of which character reference point is in detailed pages (pages 4-3 and 4-4) located at an upper position is overrunning to the central page, the overrunning portion is drawn in the central page, when a character of which character reference point is in a detailed page (page 3-3) located at an upper right position is overrunning to the central page, the overrunning portion is drawn in the central page, when a character of which character reference point is in a detailed page (page 1-1) located in a right direction is overrunning to the central page, the overrunning portion is drawn in the central page, when a character of which character reference point is in a detailed page located at lower right position is overrunning to the central page, the overrunning portion is drawn in the central page, when a character of which character reference point is in a detailed page located at a lower left position is overrunning to the central page, the overrunning portion is drawn in the central page, or when a character of which character reference point is in a detailed page (page 1-2) located in a left direction is overrunning to the central page, the overrunning portion is drawn in the central page.

At this time, since the detailed pages located beneath the pages 2-1 and 2-2 are not at the boundary of pages, and are hence out of scope of drawing. The detailed page (page 1-1) located in a right direction and the detailed page located in a lower left position are same page (same composition unit), and hence character drawing is processed in batch.

Hereinafter, supposing the partial divided memory regions of pages 3-1 and 3-2, page 1-1, and pages 1-2 and 1-3 respectively to be the central pages, when the character of which character reference point located in a detailed page positioned above, right above, right, right below, below, left below, left, or left above is overrunning to the central page, the overrunning portion is drawn in the central page.

At this time, since the object of drawing is only the boundary character located at the boundary of the detailed page and central page between different pages, it is out of the scope of drawing if the boundary of the detailed page and central page located in the surrounding is not boundary of pages.

In the above example, as the priority order of central pages, the first is pages 2-2, 2-3, 3-1 and 3-3, second is page 1-1, and third is pages 1-2 and 1-3.

<Others>

In the second preferred embodiment, the map memory 107 is composed of 2×2 divided memory regions and each divided memory is composed of 2×2 partial divided memory regions, but the same effects are obtained when the divided memory region is composed of partial divided memory regions by dividing in a matrix of K×L (K≧2, L≧2).

<<Third preferred embodiment (improvement of judging process)>>

In the first and second preferred embodiments, the boundary of judging regions is always fixed, but in a third preferred embodiment, by widening the judging region in which the own vehicle is positioned at the present, it may be considered to have a property of hysteresis in the event of change of judging region.

Figure 25:
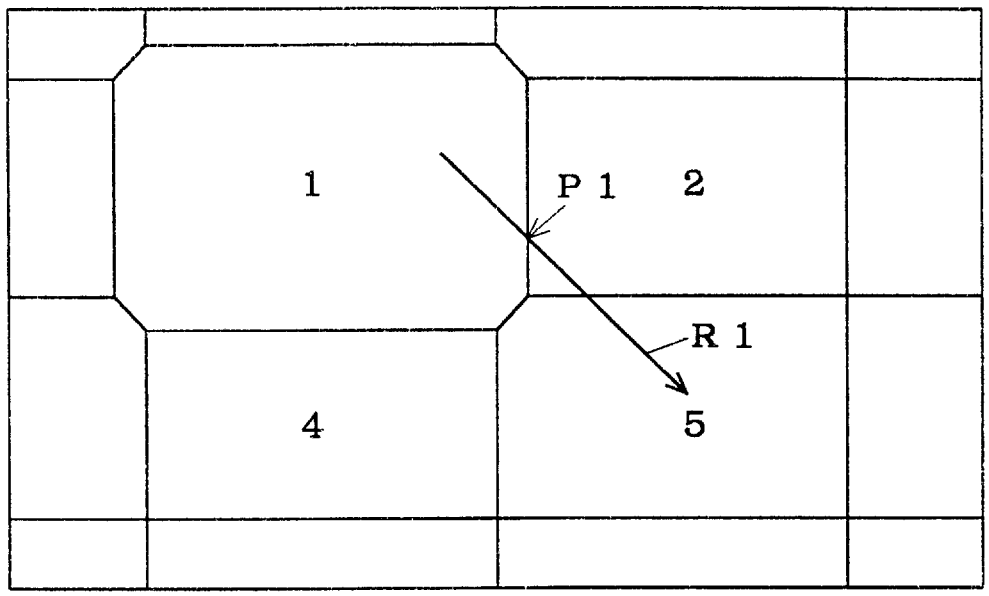
FIG. 25 is an explanatory diagram showing judging regions having hysteresis.
Figure 26:
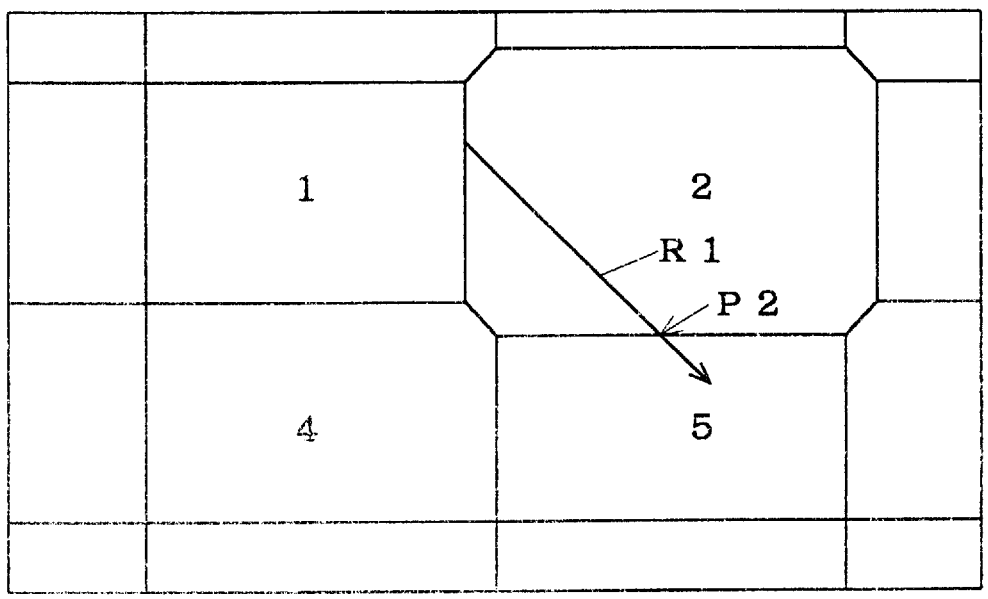
FIG. 26 is an explanatory diagram showing judging regions having hysteresis.
Figure 27:
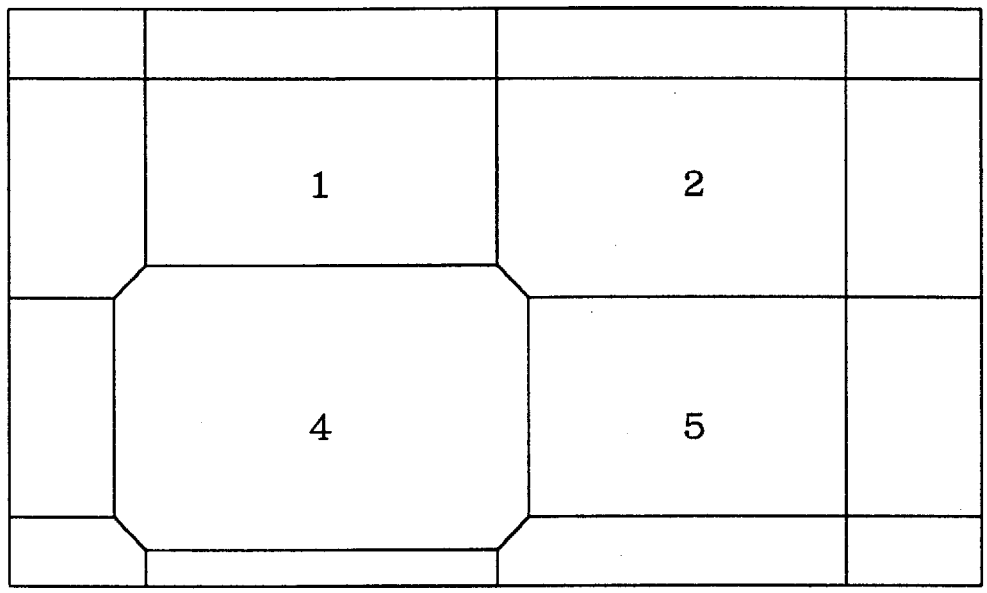
FIG. 27 is an explanatory diagram showing judging regions having hysteresis.
Figure 28:
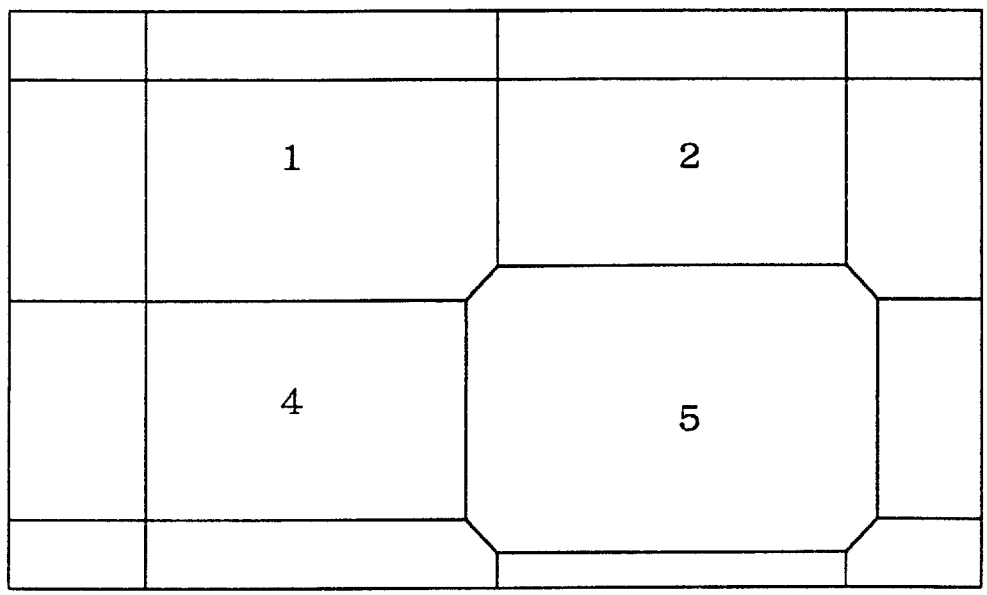
FIG. 28 is an explanatory diagram showing judging regions having hysteresis.

FIG. 25 shows the boundary line of the judging region when seeing the change from judging region 1, FIG. 26 shows the boundary line of the judging region when seeing the change from judging region 2, FIG. 27 shows the boundary line of the judging region when seeing the change from judging region 4, and FIG. 28 shows the boundary line of the judging region when seeing the change from judging region 5. They correspond to the judging regions in the first preferred embodiment shown in FIG. 6 and FIG. 7.

For example, when the reference position changes along route R1 in FIG. 25 and FIG. 26, the change from judging region 1 to judging region 2 is recognized first at point P1 in FIG. 25, and the change from judging region 2 to judging region is recognized first at point P2 in FIG. 26. At these points P1 and P2, the reference page is certainly changed.

Thus, by judging the moving direction of the own vehicle while setting wider the judging region at the present, it is free from misrecognition of moving direction due to unstable motion of the own vehicle such as zigzag motion of the reference position on the boundary of the judging region, and hence rewriting process of the map memory 107 due to misjudged moving direction of the own vehicle is lessened, thereby lessening the load of the controller 105 (CPU).

Incidentally, FIG. 25 to FIG. 28 correspond to the judging regions of the first preferred embodiment, but it is similarly applicable to the judging regions of the second preferred embodiment shown in FIG. 19.

While the invention has been shown and described in detail, the foregoing description is in all aspects illustrative and not restrictive. It is therefore understood that numerous modifications and variations can be devised without departing from the scope of the invention.

We claim:

1. A display method of navigation map using a navigation system, said navigation system comprising:

position information output means for outputting position information of an objective display point;

memory means for storing map information in a predetermined memory region, in which said memory means divides said predetermined memory region into plural divided memory regions, and divided map information obtained by dividing said map information is stored individually in said plural divided memory regions;

display means for displaying part of said map information stored in said memory means in a display object region on a display screen; and control means or controlling said memory means and said display means on the basis of said position information, in which said control means recognizes the continuity of map regardless of a physical position relation of said plural divided memory regions, and scrolls and displays part of said map information on said display screen so as to include said objective display point, said display method of navigation map comprising the steps of:

(a) dividing said predetermined memory region into plural judging regions, in which said plural judging regions are set so that the moving direction of said objective display point may be recognized at a point sufficient for displaying on said display screen without updating the content of said predetermined memory region said, plural judging regions being provided independently with said plural divided memory regions;

(b) recognizing the moving direction of said objective display point, on the basis of said position information, by determining a judging region corresponding to said objective display region out of said plural judging regions and detecting changes of said judging region corresponding to said objective display point; and (c) recognizing the display object region on said display screen and a display object off region out of said display screen in said predetermined memory region, when the moving direction of said objective display point is recognized at said step (b), and updating the map information by writing map information specifying the map continuous along the moving direction of said objective display point to the map specified by the map information in said display object region in said display object off region on a priority basis based on the recognized moving direction of said objective display point.

2. The display method of navigation map of claim 1, wherein said plural divided memory regions are divided regions of said predetermined memory region in a matrix of N×M (N≧3, M≧3), and the information quantity of said divided map information stored in each one of said plural divided memory regions is same as the information quantity of map information displayed on said display screen; and said display object region is a first predetermined number of display divided memory regions subject to display on said display screen out of said plural divided memory regions, and said display object off region is a second predetermined number of display off divided regions not subject to display on said display screen out of said plural divided memory regions.

3. The display method of navigation map of claim 2, wherein said plural judging regions are set variably on the basis of the position of said objective display point, so that a judging region corresponding to said objective display point may be always set larger.

4. The display method of navigation map of claim 2, wherein said step (c) is writing by priority a region of higher possibility of moving of said objective display point, out of said second predetermined number of display off divided memory regions, on the basis of the moving direction of said objective display point, when said second predetermined number is 2 or more.

5. The display method of navigation map of claim 2, wherein said map information has character information such as geographical names, and said character information is present within said divided map information corresponding to a character reference position corresponding to a character, said display method of navigation map, further comprising the step of:

(d) selecting one region sequentially as a center region from said display off divided memory regions and regions for storing map information specifying the map continuous to the map specified in map information in said display off divided memory regions out of said display divided memory regions, after updating process of said map information of said step, (c) and writing the portion of the characters pushed out when said character reference point in one of said plural divided memory regions besides said selected center region are pushed out to the center region, into said center region based on said character information.

6. The display method of navigation map of claim 5, wherein said step (d) is selecting by the order of said center region of high possibility of moving of said objective display point, on the basis of the moving direction of said objective display point.

7. The display method of navigation map of claim 2, wherein said map information has character information such as geographical names, and said character information is present within said divided map information corresponding to a character reference position corresponding to a character;

said display method of navigation map, further comprising the step of:

(d) selecting one region sequentially as a center region from said display off divided memory regions, after updating process of said map information of said step (c), and writing the portion of the characters pushed out when said character reference point in one of said plural divided memory regions besides said selected center region are pushed out to the center region, into said center region based on said character information.

8. The display method of navigation map of claim 7, wherein said step (d) is selecting by the order of said center region of high possibility of moving of said objective display point, on the basis of the moving direction of said objective display point.

9. The display method of navigation map of claim 1, wherein said plural divided memory regions are divided regions of said predetermined memory region in a matrix of 2×2, the information quantity of said divided map information stored in each one of said plural divided memory regions is same as the information quantity of map information displayed on said display screen, said plural divided memory regions are plural partial divided memory regions divided in a matrix K×L (K≧2, L≧2)respectively, and said plural partial divided memory regions each store partial divided map information obtained by further dividing said divided map information stored in corresponding divided memory regions; and said display object region is a first predetermined number of display partial divided memory regions subject to display on said display screen, out of said plural partial divided memory regions of each one of said plural divided memory regions, and said display off region is a second predetermined number of display off partial divided memory regions not subject to display on said display screen, out of said plural partial divided memory regions of each one of said plural divided memory regions.

10. The display method of navigation map of claim 9, wherein said step (c) is writing by priority a region of higher possibility of moving of said objective display point, out of said second predetermined number of display off partial divided memory regions, on the basis of the moving direction of said objective display point, when said second predetermined number is 2 or more.

11. The display method of navigation map of claim 9, wherein said map information has character information such as geographical names, and said character information is present within said divided map information corresponding to a character reference position corresponding to a character, said display method of navigation map, further comprising the step of:

(d) selecting one region sequentially as a center region from said display off partial divided memory regions, and partial divided memory regions for storing map information specifying the map continuous to the map specified in map information in said display off partial divided memory regions out of said display partial divided memory regions, after updating process of said map information of said step (c), and writing the portion of the characters pushed out when said character reference point in one of said plural partial divided memory regions besides said selected center region are pushed out to the center region, into said center region based on said character information.

12. The display method of navigation map of claim 11, wherein said step (d) is selecting by the order of said center region of high possibility of moving of said objective display point, on the basis of the moving direction of said objective display point.

13. The display method of navigation map of claim 9, wherein said map information has character information such as geographical names, and said character information is present within said divided map information corresponding to a character reference position corresponding to a character, said display method of navigation map, further comprising the step of:

(d) selecting one region sequentially as a center region from said display off partial divided memory regions, after updating process of said map information of said step (c), and writing the portion of the characters pushed out when said character reference point in one of said plural partial divided memory regions besides said selected center region are pushed out to the center region, into said center region based on said character information.

14. The display method of navigation map of claim 13, wherein said step (d) is selecting by the order of said center region of high possibility of moving of said objective display point, on the basis of the moving direction of said objective display point.

15. The display method of navigation map of claim 9, wherein said plural judging regions are set variably on the basis of the position of said objective display point, so that a judging region corresponding to said objective display point may be always set larger.

* * * * *